(12) United States Patent
Rehkemper et al.

(10) Patent No.: US 9,766,610 B2
(45) Date of Patent: Sep. 19, 2017

(54) INTERACTIVE APPLICATION PLATFORM FOR A MOTORIZED TOY ENTITY AND DISPLAY

(71) Applicant: Rehco, LLC, Chicago, IL (US)

(72) Inventors: Jeffrey Rehkemper, Chicago, IL (US); Steven Rehkemper, Chicago, IL (US); Michael Kadile, Chicago, IL (US); John Peach, Chicago, IL (US)

(73) Assignee: Rehco, LLC, Chicago, IL (US)

( * ) Notice: Subject to any disclaimer, the term of this patent is extended or adjusted under 35 U.S.C. 154(b) by 56 days.

(21) Appl. No.: 13/659,179

(22) Filed: Oct. 24, 2012

(65) Prior Publication Data

US 2013/0310956 A1    Nov. 21, 2013

Related U.S. Application Data

(60) Provisional application No. 61/607,729, filed on Mar. 7, 2012.

(51) Int. Cl.
| G05B 15/02 | (2006.01) |
| A63H 17/395 | (2006.01) |
| G05B 19/042 | (2006.01) |
| G05D 1/02 | (2006.01) |
| A63F 3/00 | (2006.01) |
| A63F 9/24 | (2006.01) |

(52) U.S. Cl.
CPC ...... *G05B 19/0426* (2013.01); *A63F 3/00643* (2013.01); *A63H 17/395* (2013.01); *G05D 1/0234* (2013.01); *A63F 2003/00659* (2013.01); *A63F 2009/246* (2013.01); *A63F 2009/2444* (2013.01); *A63F 2009/2458* (2013.01); *A63F 2009/2486* (2013.01); *G05B 2219/36168* (2013.01); *G05D 2201/0214* (2013.01)

(58) Field of Classification Search
None
See application file for complete search history.

(56) References Cited

U.S. PATENT DOCUMENTS

| 5,923,270 A * | 7/1999 | Sampo ................ A01B 69/008 |
| | | 180/6.7 |
| 6,632,122 B2 * | 10/2003 | Klitsner ............... A63H 17/395 |
| | | 446/441 |
| 8,396,597 B2 * | 3/2013 | Anderson ............ G05D 1/0274 |
| | | 318/577 |

(Continued)

FOREIGN PATENT DOCUMENTS

EP         0687964 A1 * 12/1995 ............. G05D 1/00

*Primary Examiner* — Ronald Hartman, Jr.
(74) *Attorney, Agent, or Firm* — Brooks Kushman P.C.

(57) ABSTRACT

An illustrative application control system is provided having an entity and an electronic device with a display. The control system includes software operating instructions to direct movement of the entity and to direct display operation to interact with the entity. The entity may have the capability to move when positioned on the display and to detect pixels and pixel arrangements on the display. The electronic device may include the capability to generate and display the pixels and pixel arrangements in subsequent locations on the display to trigger entity responses. The software operating instructions may include content such as audio output and/or performance instructions to facilitate interaction between the entity and electronic device.

27 Claims, 13 Drawing Sheets

(56) References Cited

U.S. PATENT DOCUMENTS

| | | | | |
|---|---|---|---|---|
| 8,463,463 B1* | 6/2013 | Feldmann | ............... | G05D 1/104 |
| | | | | 33/431 |
| 8,706,298 B2* | 4/2014 | Goulding | ............... | G06N 3/008 |
| | | | | 700/251 |
| 9,146,558 B2* | 9/2015 | Field | .................... | G05D 1/0044 |
| 2002/0111118 A1* | 8/2002 | Klitsner | ............... | A63H 17/395 |
| | | | | 446/484 |
| 2009/0228166 A1* | 9/2009 | Durkos | ................ | G05D 1/0219 |
| | | | | 701/26 |
| 2009/0234499 A1* | 9/2009 | Nielsen | .................... | B25J 9/161 |
| | | | | 700/250 |
| 2009/0299526 A1* | 12/2009 | Ditscher | ................ | B25J 9/1671 |
| | | | | 700/264 |
| 2013/0109272 A1* | 5/2013 | Rindlisbacher | ........ | A63H 30/04 |
| | | | | 446/454 |
| 2013/0288560 A1* | 10/2013 | Abou-Hamda | ...... | A63H 33/005 |
| | | | | 446/175 |
| 2015/0364060 A1* | 12/2015 | Gupta | .................... | B25J 9/0081 |
| | | | | 434/118 |

* cited by examiner

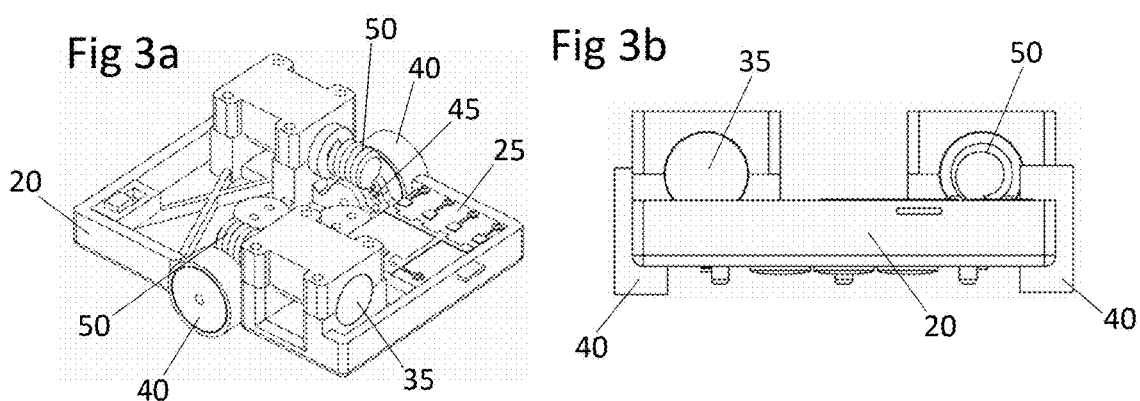
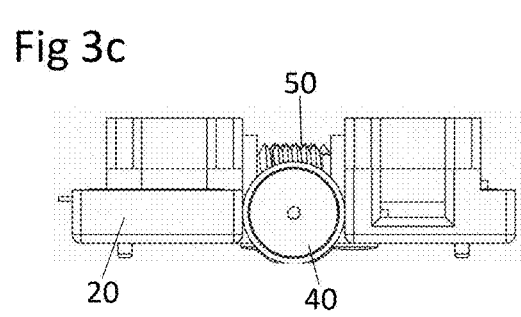 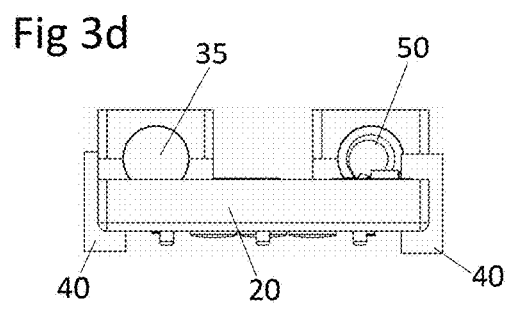
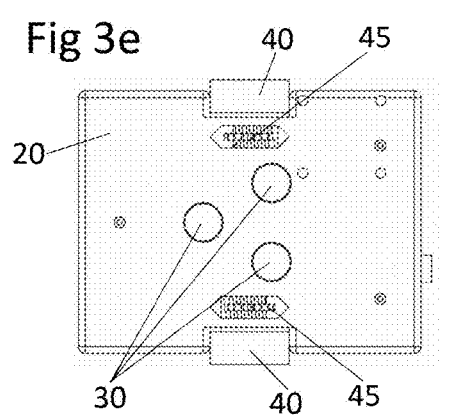 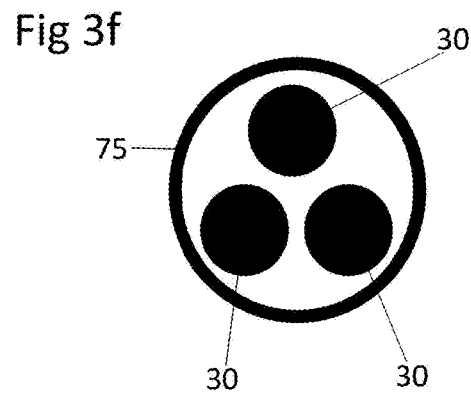

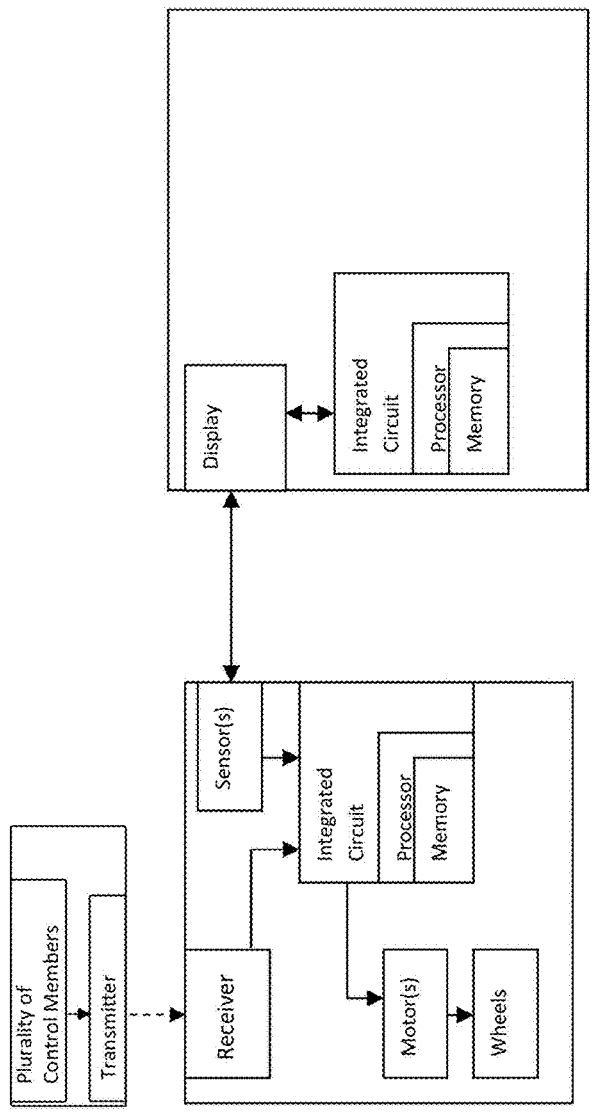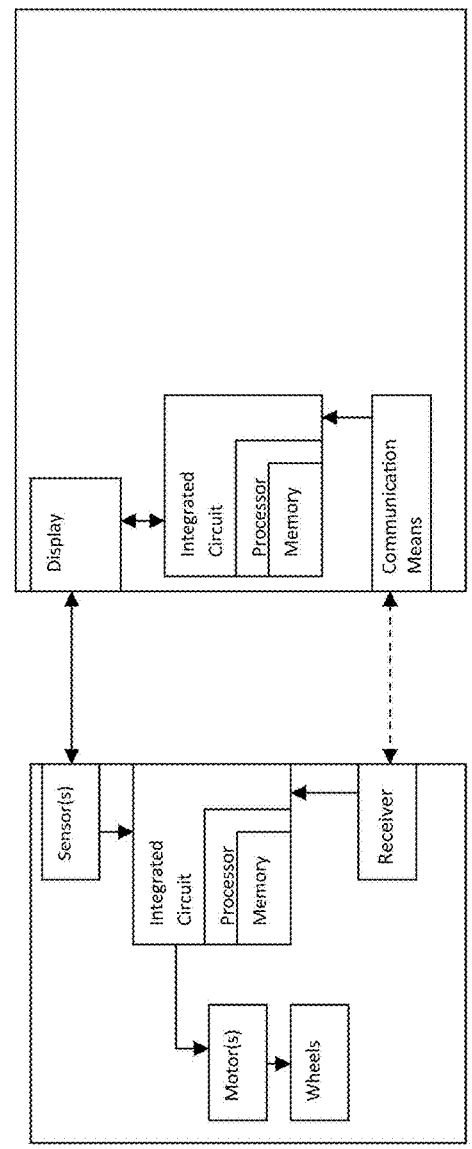
FIG 6a
FIG 6b

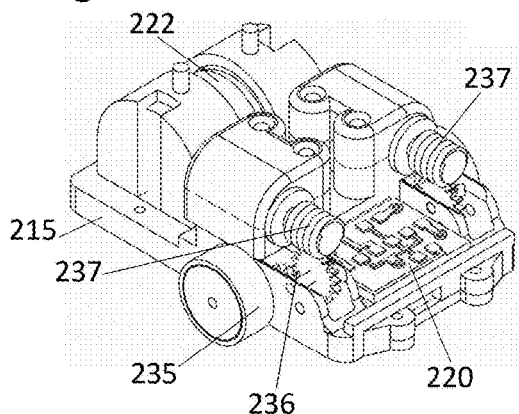
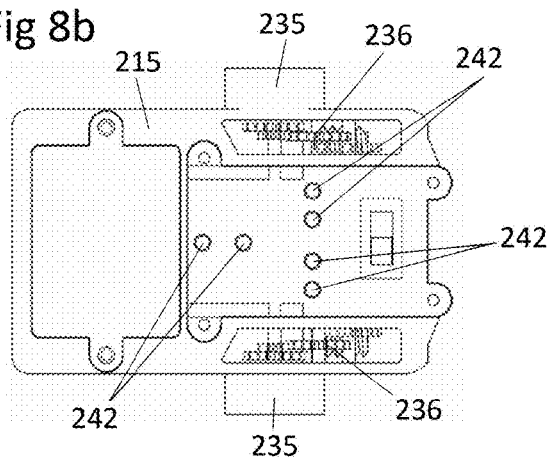
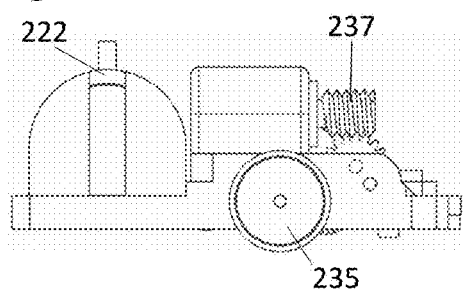
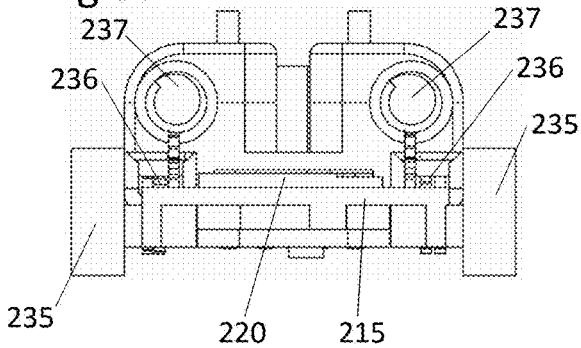
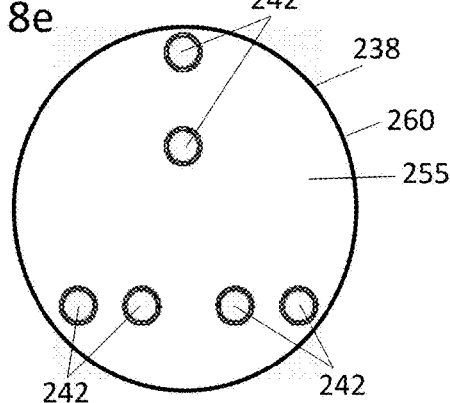

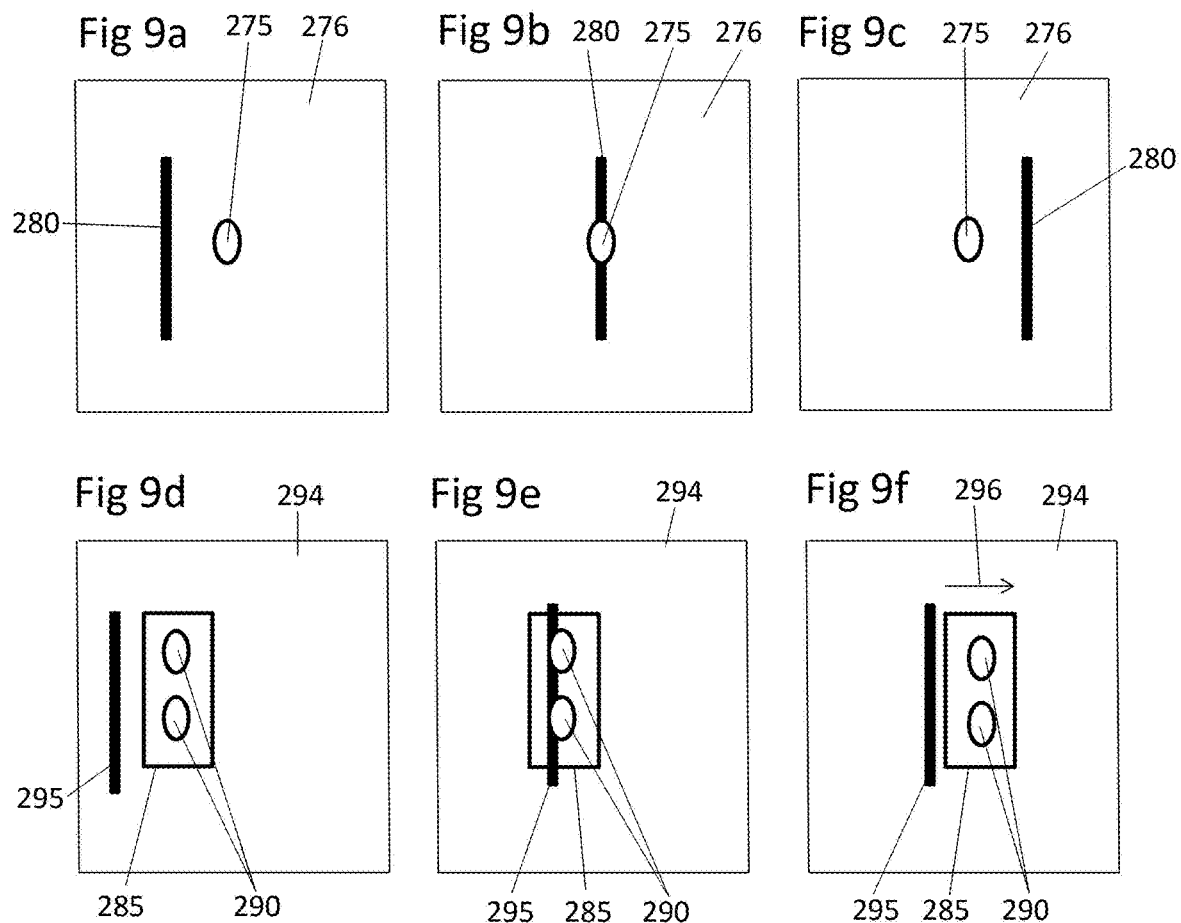

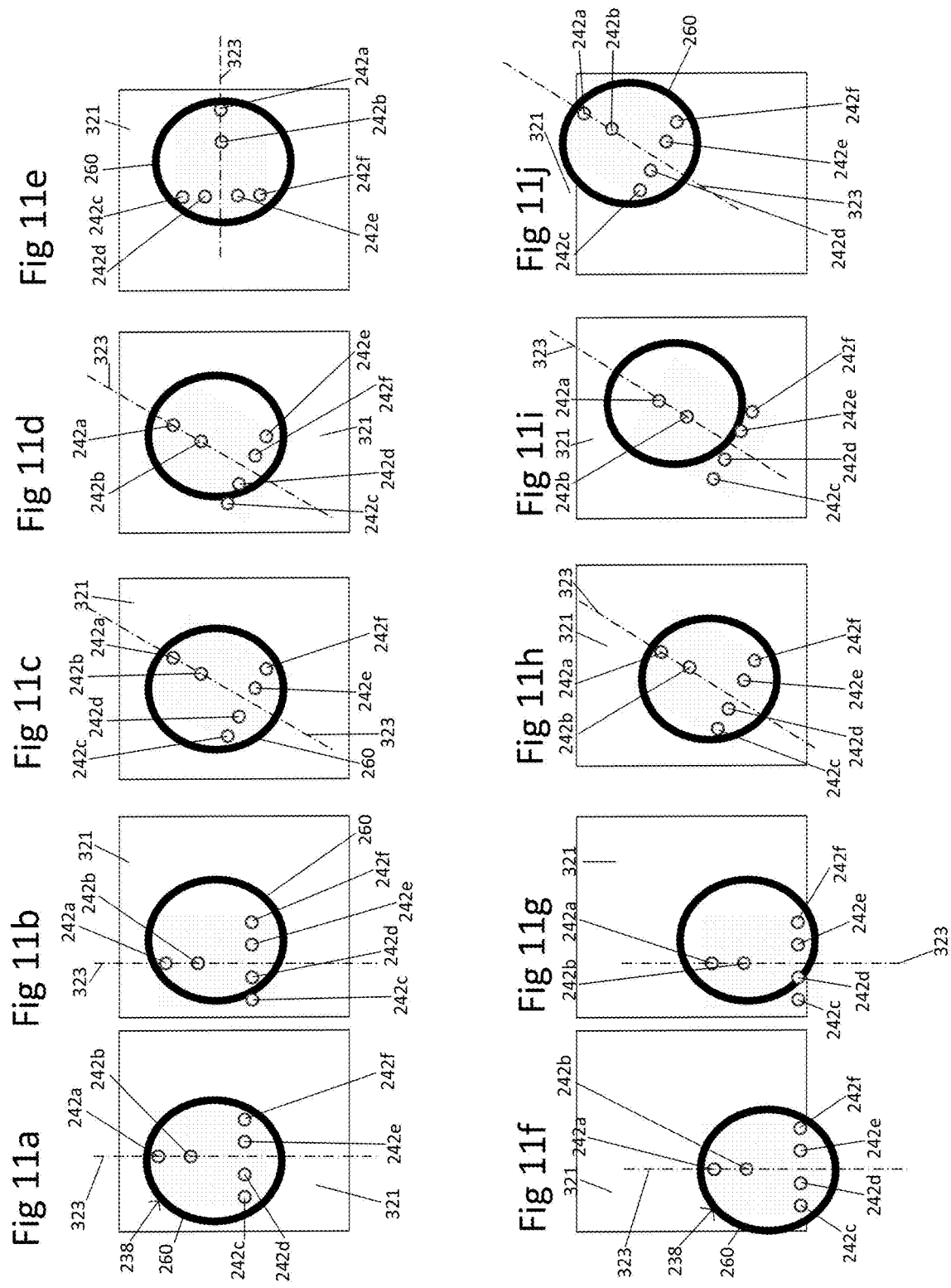

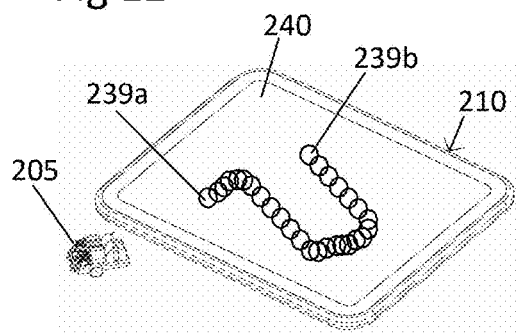
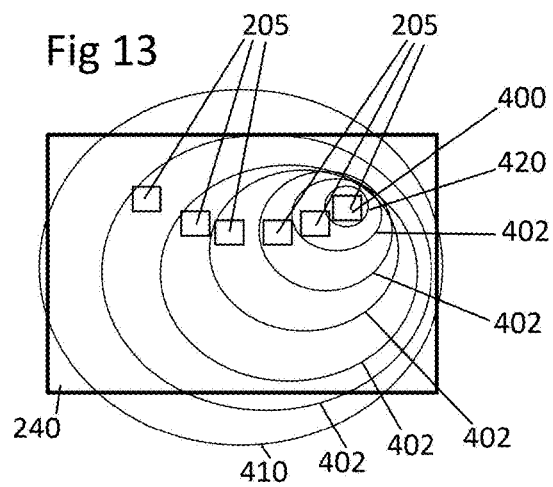
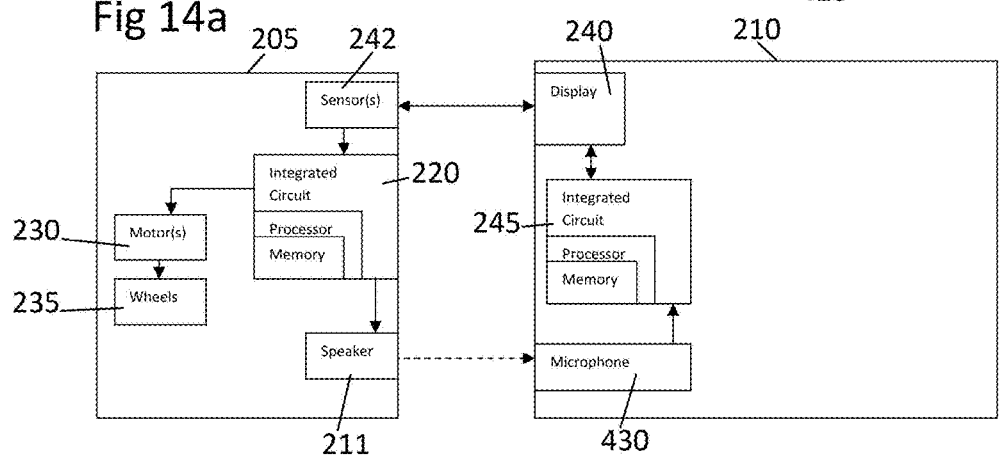
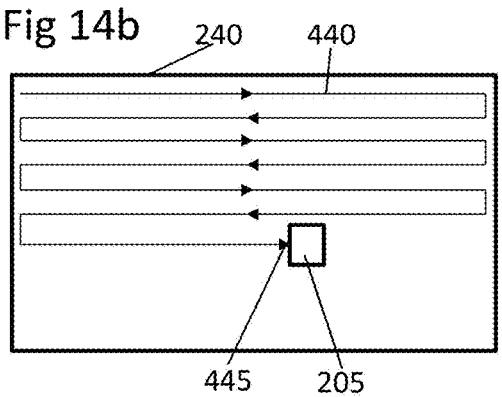
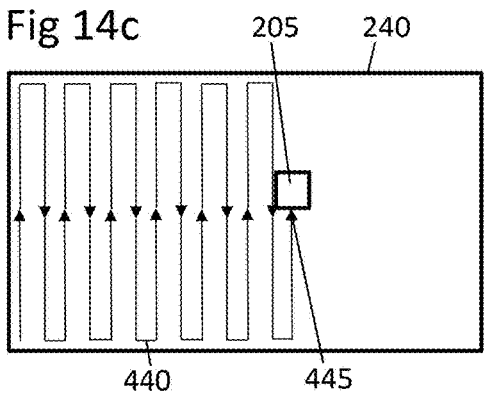

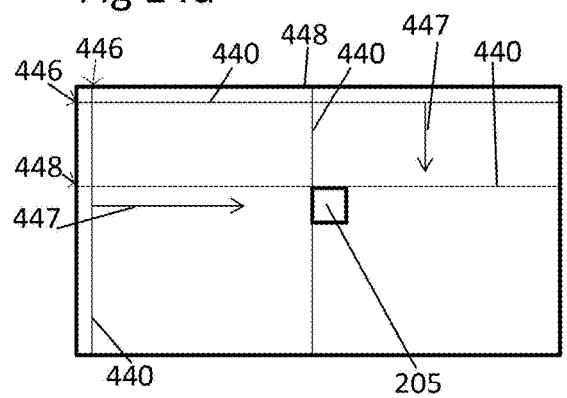
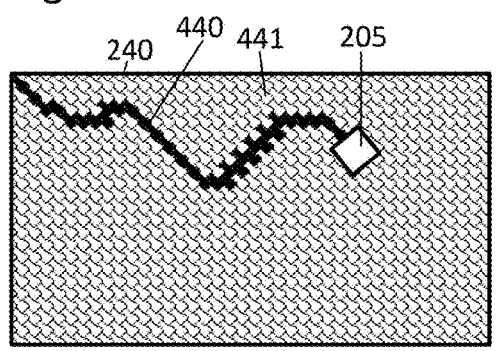
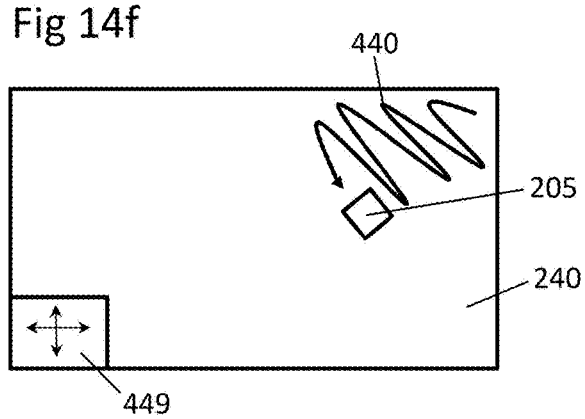
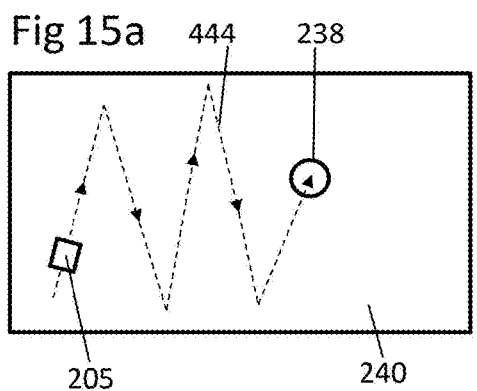
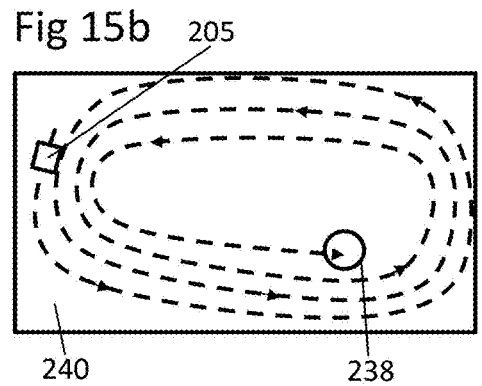

INTERACTIVE APPLICATION PLATFORM FOR A MOTORIZED TOY ENTITY AND DISPLAY

CROSS REFERENCE TO RELATED APPLICATION

The present application claims priority to U.S. Provisional Application No. 61/607,729 filed on Mar. 7, 2012 entitled "Interactive Application Platform for a motorized Toy Entity and Display."

FIELD OF THE INVENTION

The present invention relates to an application control system for a motorized entity and a device with a display which provides an interactive play experience utilizing the electronics and mechanics of the motorized entity and device.

BACKGROUND OF THE INVENTION

Systems, such as gaming systems or mobile application systems are a popular way for people to entertain and/or educate themselves by interacting with programming or other users. A need exists for interactive platforms to utilize a control system to combine the elements of toy entities, software operating capability and electronic devices to provide improved interaction options and experiences.

SUMMARY OF THE INVENTION

In one or more illustrative embodiments there may be provided a control system for a motorized entity having an electronic device with a display, and an electronic device integrated circuit with a set of marker control software instructions including a capability to generate and display a position marker having an area within a pixel arrangement. The control system may further have an entity with one or more sensors in communication with an entity integrated circuit, the entity integrated circuit in communication with a motorized capability to move the entity and including a set of entity control software instructions, the one or more sensors capable of detecting a pixel arrangement and configured to send a detection signal to the entity integrated circuit upon detection thereof. The control system may also have a capability to direct entity movements including where the set of marker control software instructions are configured to (i) generate and display the position marker on the display, and (ii) generate and display the position marker in subsequent locations on the display in a programmed pattern; and the set of entity control software instructions are configured to (i) receive one or more detection signals from the one or more sensors indicating detection of a pixel arrangement, and (ii) send control signals to the motorized capability to move the entity to maintain entity positioning in relation to the detected pixel arrangement. As such, when the entity is positioned within the pixel arrangement at an initial position, the one or more sensors send a detection signal to the entity integrated circuit when the sensors detect the pixel arrangement to activate the motorized capability to move the entity to maintain entity positioning in relation to the pixel arrangement to move the entity in accordance to the programmed pattern of the displayed subsequent locations of the position marker. The pixel arrangement surrounding the position marker area may form a border for utilization with a ready state alignment between the one or more sensors and the border defined as an alignment such that the one or more sensors are positioned within the border. The set of entity control software instructions may further be configured to activate the motorized capability to move the entity to adjust entity positioning and move to the ready state alignment in the subsequent locations of the position marker. Additionally, the entity may further include a speaker in communication with the entity integrated circuit and audio content stored on the entity integrated circuit and the set of marker control software instructions may further include a capability to generate and display a pixel arrangement with audio instructions embedded therein and in accordance with the audio content. The set of entity control software instructions may further be configured to (i) receive one or more detection signals from the one or more sensors indicating detection of a pixel arrangement with audio instructions embedded therein, (ii) direct the entity integrated circuit to translate the audio instructions to audio control signals, and (iii) direct the audio content to output via the speaker in accordance with the audio control signal. The entity may also include at least one light emitting diode configured to illuminate a an element of the entity, such as headlights or eyes, and configured to illuminate a surface such that the one or more sensors may detect a position marker on the surface to activate the capability to move the entity. The entity may also include a light pipe configured to utilize light emitting from the display to illuminate a portion of the entity. The display may also include touch capacitance capability and the entity may include a capability to trigger a change in the display's capacitance levels at different locations on the display in accordance to the positioning of the entity when a user touches the entity such that the electronic device integrated circuit may determine the entity's location on the display when a user touches the entity. The capability to trigger a change in the display's capacitance levels may also include a piece of conductive metal secured to a chassis of the entity and in contact with the display to transfer the charge from a user to the display when the user touches the entity.

The motorized capability to move the entity may include two motors in communication with the entity integrated circuit and a power source, each motor in communication with a respective wheel where the entity integrated circuit is configured to send control signals to activate the two motors to rotate each wheel in accordance with the set of entity control software instructions to move the entity. The display may include a touch capacitance controller in communication with the device integrated circuit to direct the marker control software instructions to generate the position marker in a user determined pattern to direct movement of the entity in accordance thereto. A receiver may also be in communication with the integrated circuit a transmitter included on a remote control such that a user may initiate entity movements by sending commands to the receiver to activate the two motors to rotate each wheel in accordance to the commands.

The entity integrated circuit may further include programmed entity performance content and software operating instructions to activate the entity performance content embedded on a pixel arrangement such as an instructional pixel arrangement. The marker control software instructions may further include a capability to generate and display the instructional pixel arrangement. The one or more sensors may be an image sensor in communication with the entity integrated circuit and including a capability to capture the instructional pixel arrangement. The entity control software instructions may further be configured to (i) receive one or more detection signals from the image sensor indicating detection of the instructional pixel arrangement, (ii) direct the entity IC to translate the software operating instructions to control signals, and (iii) direct the entity to operate in accordance with the control signals such that the entity executes a pattern of movements in accordance with the entity performance content and in response to the entity integrated circuit's receipt of the software operating instructions.

In another illustrative embodiment there may be provided a control system for a motorized entity having an electronic device with a display and an electronic device integrated circuit with a set of marker control software instructions with a capability to display a plurality of position markers, each position marker including a marker area within a pixel arrangement. The plurality of position markers may include a location marker and an initial marker. The control system may further have an entity with one or more sensors in communication with an entity integrated circuit, the entity integrated circuit in communication with a motorized capability to move the entity and including a set of entity control software instructions where the one or more sensors are capable of detecting pixel arrangements and configured to send a detection signal to the entity integrated circuit upon detection thereof. A capability to direct entity movements includes the set of marker control software instructions being configured to (i) generate and display the position marker as the initial marker, (ii) generate and display subsequent position markers, each subsequent position marker having an area smaller than the previous position marker area, the last of the subsequent position markers displayed being the location marker at a location and the set of entity control software instructions being configured to (i) receive one or more detection signals from the one or more sensors indicating detection of a pixel arrangement, and (ii) send control signals to the motorized capability to move the entity to maintain entity positioning in relation to the detected pixel arrangement. As such, when the entity moves to the location, the one or more sensors send detection signals to the entity integrated circuit to activate the motorized capability to move the entity in accordance with detected pixel arrangements. The initial marker may be great than, equal to, or less than an area of the display. The pixel arrangement surrounding the position marker area may form a border to facilitate the utilization of a ready state alignment defined as an alignment where the one or more sensors are positioned within the position marker area. Whereby the set of entity control software instructions activate the motorized capability to move the entity to return to the ready state alignment as the plurality of position markers are displayed at subsequent locations.

The set of marker control software instructions may further be configured to display the plurality of position markers in subsequent locations at incremental distances equal to a sensor detection distance defined as a distance less than or equal to the distance between the sensors. The motorized capability to move the entity may include two motors in communication with the entity integrated circuit and a power source, each motor further in communication with a respective wheel such that the entity integrated circuit is configured to send control signals to activate the two motors to rotate each wheel to move the entity in accordance with the set of entity control software instructions.

In yet another illustrative embodiment there may be provided a control system for a motorized entity having an electronic device with a display and an electronic device integrated circuit, the device integrated circuit including a set of marker control software instructions with a capability to generate and display a position marker having an area within a pixel arrangement; an entity with one or more sensors in communication with an entity integrated circuit, the entity integrated circuit further in communication with a motorized capability to move the entity and including a set of entity control software instructions, the one or more sensors capable of detecting pixel arrangements and configured to send a detection signal to the entity integrated circuit upon detection thereof. The entity may also include a capability to locate the position marker wherein the set of entity control software instructions are configured to activate the motorized capability to move the entity to execute a location movement further defined as a series of entity movements in a preprogrammed pattern on the display where the entity executes the movements until the sensors detect the pixel arrangement of the position marker. As such, when the device generates and displays the position marker, the entity is placed on the display and the set of entity control programmed software instructions activates the location movement such that the entity moves in the programmed pattern until the entity locates the position marker.

The entity further including a speaker in communication with the entity integrated circuit where the set of entity control software instructions may further be configured to send a control signal to the speaker to emit an audio location output when the sensors detect the position marker and the electronic device further may include a microphone capable of detecting the audio location output and sending an audio output detection signal to the device integrated circuit. As such, the set of marker control software instructions may identify the location of the pixel illuminated at the time of the sensor detection to determine the location of the entity. The motorized capability to move the entity may have two motors in communication with the entity integrated circuit and a power source, each motor further in communication with a respective wheel where the entity integrated circuit is configured to send control signals to activate the two motors to rotate each wheel in accordance with the set of entity control software instructions to move the entity.

In yet another illustrative embodiment there may be provided a control system to locate a motorized entity on a display having an electronic device with a display, a microphone, and an electronic device integrated circuit with a set of entity locating software instructions with a capability to generate and display a sequence of pixels in a location pattern, and to further receive an audio output detection signal from the microphone; an entity with a speaker and one or more sensors in communication with an entity integrated circuit, the entity integrated circuit including a set of entity control software instructions, the one or more sensors capable of detecting pixels and configured to send a pixel detection signal to the entity integrated circuit upon detection thereof. The control system also may include a capability to locate the entity when positioned on the display where the set of entity locating software instructions are configured to (i) generate and display the sequence of pixels in the location pattern, and (ii) receive an audio output detection signal from the microphone and identify the pixel displayed at the time the audio output detection signal is sent and the set of entity control programmed software instructions may be configured to (i) receive a pixel detection signal from the one or more sensors indicating detection of a pixel(s), and (ii) send a control signal to the speaker to emit an audio location output signal when a pixel detection signal is received such that the device integrated circuit locates the entity by identifying the pixel generated at the time the audio output detection signal is sent.

The electronic device may further have a set of marker control software instructions with a capability to generate and display a position marker having an area with a pixel arrangement at the entity's location as determined by the capability to locate the entity; and the entity integrated circuit further in communication with a motorized capability to move the entity and including a set of entity control software instructions, the one or more sensors capable of detecting a pixel arrangement and configured to send a detection signal to the entity integrated circuit upon detection thereof. A capability to direct entity movements includes the set of marker control software instructions being configured to (i) generate and display the position marker on the display, and (ii) generate and display the position marker in subsequent locations on the display in a programmed pattern and the set of entity control software instructions being configured to (i) receive one or more detection signals from the one or more sensors indicating detection of a pixel arrangement, (ii) send control signals to the motorized capability to move the entity to adjust and maintain entity positioning in relation to the detected pixel arrangement such that the entity moves in accordance to subsequent locations of the position marker.

The pixel arrangement surrounding the position marker area may form a border to facilitate a ready state alignment between the one or more sensors and the border defined as an alignment such that the one or more sensors are positioned within the border wherein the set of entity control software instructions are further configured to activate the motorized capability to move the entity to return to the ready state alignment as the position marker is displayed at subsequent locations.

The pixel arrangement surrounding the position marker area may form a border to facilitate an alignment where the set of entity control software instructions are further configured to activate the motorized capability to move the entity to maintain entity positioning outside the border in accordance to the displayed subsequent locations of the position marker.

The motorized capability to move the entity may have two motors in communication with the entity integrated circuit and power source, each motor further in communication with a respective wheel and the entity integrated circuit configured to send control signals to activate the two motors to rotate each wheel in accordance with the set of entity control software instructions to move the entity.

The display may include a touch capacitance controller in communication with the device integrated circuit such that the touch capacitance controller directs the marker control software instructions to generate the position marker in a user determined pattern to direct movement of the entity in accordance thereto. The motorized capability to move the entity may have a receiver in communication with the integrated circuit and a remote control unit with a transmitter such that a user initiates entity movements by sending commands to the receiver to activate the two motors to rotate each wheel in accordance to the commands.

In yet another illustrative embodiment there may be provided a control system for an entity and electronic device where the electronic device may have a display, and an electronic device integrated circuit with a set of position marker software instructions with a capability to generate and display one or more position markers having an area within a pixel arrangement; and the entity may have one or more sensors in communication with an entity integrated circuit, the entity integrated circuit in communication with a capability to activate a response element of a plurality of response elements and including a set of entity response software instructions, the one or more sensors capable of detecting a pixel arrangement and configured to send a detection signal to the entity integrated circuit upon detection thereof. The capability to activate the response elements may utilize a configuring of the set of position marker software instructions to generate and display one or more pixel arrangements on the display and a configuring of the set of entity response software instructions to receive one or more detection signals from the one or more sensors indicating detection of a pixel arrangement and as such, send control signals to the entity integrated circuit to trigger the capability to activate the response element(s). The plurality of response elements may include a light, speaker and/or motor on the entity and in communication with the integrated circuit such that the integrated circuit may activate one or more of the response elements when a control signal is received.

Numerous other advantages and features of the invention will become readily apparent from the following detailed description of the embodiments thereof, from the claims, and from the accompanying drawings.

BRIEF DESCRIPTION OF THE DRAWINGS

A fuller understanding of the foregoing may be had by reference to the accompanying drawings, wherein:

FIG. 3a is a perspective view of the entity from FIG. 1;

FIG. 3b is a front view of FIG. 3a;

FIG. 3c is a perspective side view of FIG. 3a;

FIG. 3d is a rear view of FIG. 3a;

FIG. 3e is a bottom view of FIG. 3a;

FIG. 3f is a top view of sensors included in the entity positioned within a light marker;

FIG. 6a is a block diagram illustrating an embodiment in accordance with the present invention;

FIG. 6b is a block diagram illustrating an embodiment in accordance with the present invention;

FIG. 7b is a rear perspective view of an illustrative entity which may be utilized with the control system of FIG. 7a;

FIG. 8a is a front perspective view of the entity from FIG. 7b;

FIG. 8b is a bottom view of the entity from FIG. 7b;

FIG. 8c is a side view of the entity from FIG. 7b;

FIG. 8d is a front view of the entity from FIG. 7b;

FIG. 8e is an illustrative sensor configuration which may be used by the entity from FIG. 7b;

FIG. 9a is an illustrative pixel arrangement displayed to the left of an illustrative sensor on an illustrative display;

FIG. 9b is FIG. 9a where the pixel arrangement is displayed beneath the sensor;

FIG. 9c is FIG. 9a where the pixel arrangement is displayed to the right of the sensor;

FIG. 9d is an illustrative pixel arrangement displayed to the left of an illustrative motorized entity with an illustrative sensor configuration on an illustrative display;

FIG. 9e is FIG. 9d where the pixel arrangement is displayed beneath the sensor configuration and motorized entity;

FIG. 9f is FIG. 9d where the motorized entity has moved to the right of the pixel arrangement;

FIGS. 11a is an illustrative sensor configuration within an illustrative position marker on an illustrative display;

FIG. 11b is FIG. 11a with the position marker displayed to the right of the positioning in 11a;

FIG. 11c is FIG. 11b with the sensor configuration positioned within the position marker;

FIG. 11d is FIG. 11c with the position marker displayed to the right of the positioning in FIG. 11c;

FIG. 11e is FIG. 11e with the sensor configuration positioned within the position marker;

FIGS. 11f is an illustrative sensor configuration within an illustrative position marker on an illustrative display;

FIG. 11g is FIG. 11f with the position marker displayed to the right and forward of the positioning in FIG. 11f;

FIG. 11h is FIG. 11g with the sensor configuration is positioned within the position marker;

FIG. 11i is FIG. 11h with the position marker is displayed to the right and forward of the positioning in FIG. 11h;

FIG. 11j is FIG. 11i with the sensor configuration positioned within the position marker;

FIG. 12 is in an exemplary pattern of subsequent locations of an exemplary position marker for use with an illustrative control system;

FIG. 13 is an illustrative set of position markers for use with an illustrative control system;

FIG. 14a is a block diagram of another illustrative control system;

FIG. 14b is an exemplary location pattern;

FIG. 14c is an exemplary location pattern;

FIG. 14d is an exemplary location pattern;

FIG. 14e is an exemplary location pattern;

FIG. 14f is a view of an exemplary game;

FIG. 15a is a view of an illustrative location movement; and

FIG. 15b is a view of an illustrative location movement.

DESCRIPTION OF THE EMBODIMENTS

Figure 1:
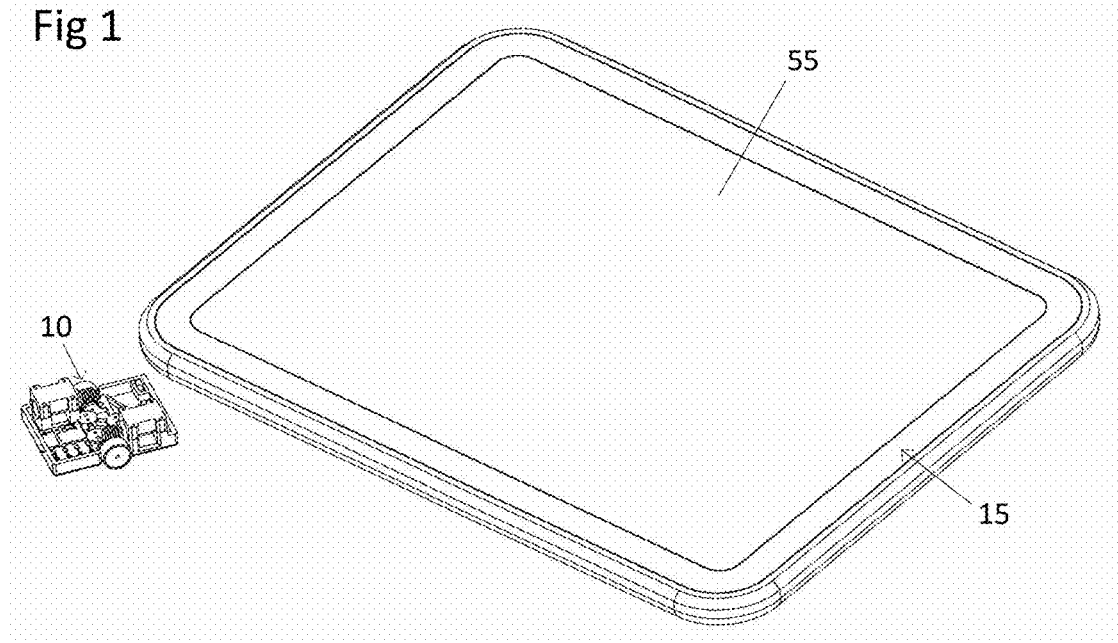
FIG. 1 is a perspective view of an entity and smart device in accordance with an embodiment of the present invention.
Figure 2:
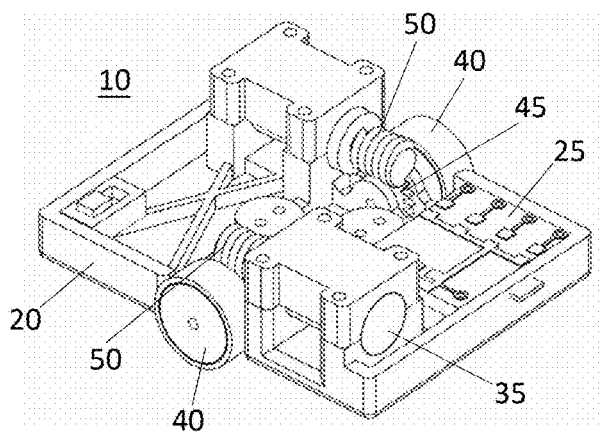
FIG. 2 is a perspective view of the entity from FIG. 1.

While the invention is susceptible to embodiments in many different forms, there are shown in the drawings and will be described herein, in detail, the preferred embodiments of the present invention. It should be understood, however, that the present disclosure is to be considered an exemplification of the principles of the invention and is not intended to limit the spirit or scope of the invention or the embodiments illustrated.

Referring now to FIGS. 1-3f, there is illustrated a motorized entity 10 and smart device 15 in accordance with one embodiment of the present invention. An application control system directs entity 10 movements in accordance with programming for various play patterns incorporating the smart device 15 (further described below). Examples of smart devices include smartphones, tablets or other similar devices that include at least one integrated circuit and a touch sensitive display. The entity 10 may be in various forms including a vehicle, character or animal. The application control system includes the electronics and content of the smart device 15 and entity 10 to direct entity 10 movements. Additionally, the entity 10 may be controlled via a remote controller or the smart device 15.

The entity 10 includes a chassis 20, a chassis integrated circuit 25 ("IC"), three sensors 30, motors 35, and wheels 40. While this embodiment utilizes three sensors 30, embodiments with a different number of sensors, different type of sensor and sensor configurations are available without departing from the scope of the present invention (described further below). The chassis IC 25 receives inputs from the sensors 30 then directs entity 10 actions and movements via control signals sent from the chassis IC 25 to the motors 35. Each wheel 40 is in rotatable communication with a drive gear 45 meshed to a worm gear 50. The worm gear 50 is driven by its respective motor 35. Powering the motor 35 in a first direction drives the wheel 40 forward while powering the motor 35 in a second direction drives the wheel 40 in reverse. Control signals sent to the motors 35 steer the entity 10 in a manner known as tank-drive steering where applying different motor 35 outputs direct turning and movement. The sensors 30, such as photo resistors are positioned on the bottom of the chassis 20 such that the sensors 30 face a display 55 of the smart device 15. Now additionally referring to FIG. 4, the smart device 15 includes the display 55, a smart device IC 60 and may also include a communication means to send commands to the entity 10 to direct entity 10 movements and actions. The smart device IC 60 includes at least one processor 65 and a memory 70 to facilitate content and direct control signals within the smart device 15.

The sensors 30 are utilized to trigger entity 10 positioning on the display 55 and to obtain information from the display 55 to transfer to the chassis IC 25 for use in directing movement of the entity 10 and activating lights and/or audio. One example of sensors 30 for use in this embodiment is photo resistors which change resistance in accordance to the amount of light detected. These photo resistors can recognize light intensities, such as a marker 75 with a white dot and black background. FIG. 3f illustrates the sensors 30 on the marker 75 in a fashion that would trigger a signal to the chassis IC 25. As such, the sensors 30 identify the marker's 75 position relative to the sensors 30 and send signals to the chassis IC 25 to identify the position to synch entity 10 movements to the movement of the marker 75. For example and now referring to FIGS. 5a-5d, the smart device 15 may include preprogrammed content in the memory 70 to direct the entity 10 to move in a pattern on the display between points, areas and/or in accordance to content. In this example, the travel path is indicated with directional arrows 80. At area one 85, the display 55 generates the marker 75. When the entity 10 is placed over the marker 75, the sensors 30 detect the marker 75 and send a signal to the chassis IC 25 identifying the entity 10 position at area one 85. The smart device 15 also recognizes that the entity 10 is on the display 55 via touch capacitance and sends a signal to the smart device IC 60. The smart device IC 60 may then move the marker 75 to area two 90 in steps. As the marker 75 moves, the sensors 30 send signals to the chassis IC 25 to direct the motors 35 to power and move the entity 10 such that the sensors 30 remain above the marker 75, thus following the path of the marker 75 to arrive at area two 90 and then to area an three 95 in similar fashion.

Continuing to refer to FIGS. 5a-5d the smart device 15 may also include preprogrammed content in the memory 70 to direct the entity 10 to move in a pattern on the display between user-defined points, and/or areas. In this example, the entity 10 is positioned at area one 85 as in the previous example. At area one 85, the display 55 generates the marker 75. When the entity 10 is placed over the marker 75, the sensors 30 detect the marker 75 and send a signal to the chassis IC 25 identifying the entity 10 position at area one 85. The smart device 15 also recognizes that the entity 10 is on the display 55 via touch capacitance and sends a signal to the smart device IC 60. The user then touches area two 90 of the display 55 to define a destination for the entity 10. The smart device's IC 60 recognizes the user input and then moves the marker 75 to area two 90. As the marker 75 moves, the sensors 30 send signals to the chassis IC 25 to direct the motors 35 to power and move the entity 10 such that the sensors 30 remain above the marker 75, thus following the path of the marker 75 to arrive at area two 90.

Figure 4:
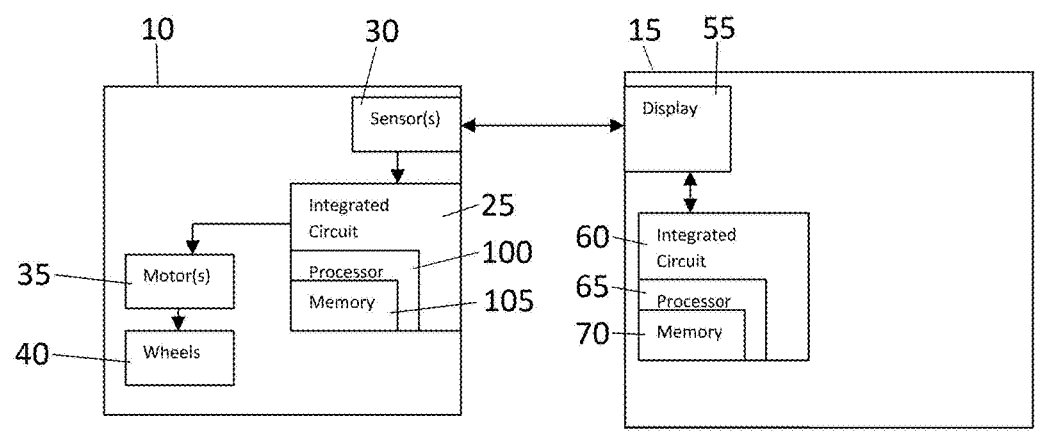
FIG. 4 is a block diagram of one of the embodiments of the present invention.
Figure 5A:
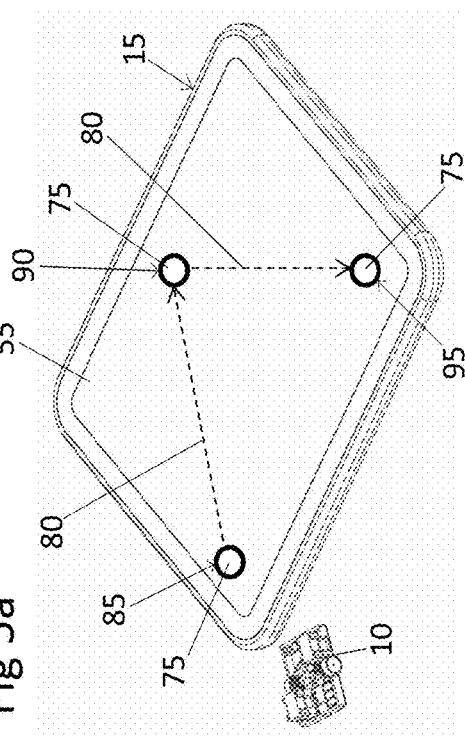
FIG. 5a is a perspective view of the entity and smart device from FIG. 1 where a display illustrates an example of a movement path for the entity.
Figure 5B:
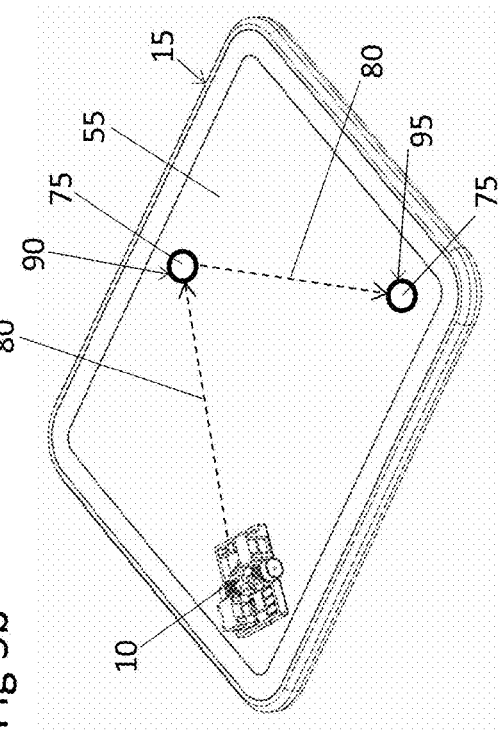
FIG. 5b is a perspective view of FIG. 5a where the entity is positioned on the display at a first area.
Figure 5C:
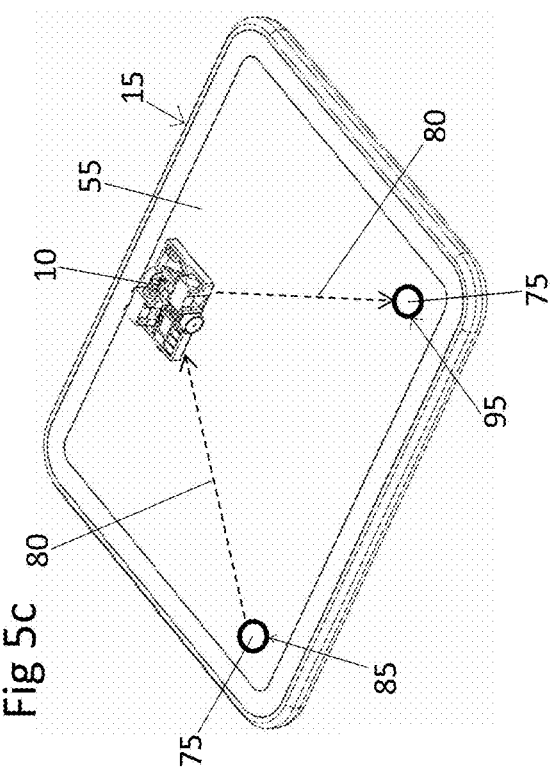
FIG. 5c is a perspective view of FIG. 5a where the entity is positioned on the display at a second area.
Figure 5D:
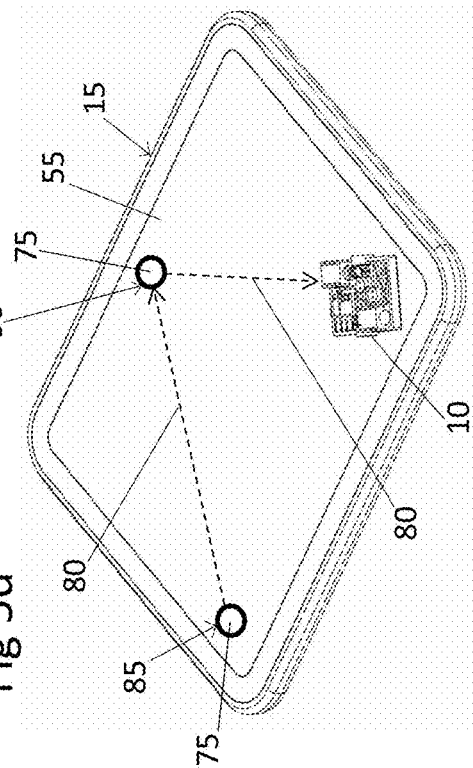
FIG. 5d is a perspective view of FIG. 5a where the entity is positioned on the display at a third area.

Referring now to FIG. 4, there is shown a block diagram provided for an embodiment of the entity 10 and application control system. When the sensors 30 are triggered, a signal is sent via an electrical connection to the chassis IC 25. For example and as mentioned above, the smart device 15 generates the marker 75 on the display 55, and the sensors 30 detect the marker 75 on the display 55 of the smart device 15. The sensor 30 then sends a signal to the chassis IC 25 indicating detection. The chassis IC 25 contains at least one processor 100 and a memory 105. The processor 100 receives the signal from the sensors 30 and accesses preprogrammed signals or audio content stored on the memory 105. The chassis IC 25 further includes programming and electronic components to facilitate and direct control signals. After receiving the signal indicating detection, the processor 100 then generates a response that includes signals, such as control signals and/or audio signals. The chassis IC 25 is in communication with the motors 35 and other components as desired. The processor 100 sends the control signals to the motors 35 to direct the wheels 40 to power based on a program and/or in accordance to a preprogrammed response. In this example, the processor 100 directs the motors 35 to power in accordance with the movement of the marker 75.

Additional types of sensor or sensors may be used without departing from the scope of the present invention. For example, the sensor may be an imaging device, such as a photo diode or CMOS camera, positioned on the bottom of the chassis. Varying pixel combinations with directional content may be displayed on the display and captured by the imaging device. The directional content is sent to the chassis IC to process and direct entity movements in accordance thereto. In another example, one photo resistor is positioned on the bottom of the chassis and is used to receive code in the form of flashing light.

Referring now to FIG. 6a, a block diagram illustrates another embodiment of the present invention where the application control system includes remote control of a motorized entity and the entity includes a receiver in communication with a controller including a transmitter and a plurality of control members.

Referring now to FIG. 6b, a block diagram illustrates another embodiment of the present invention where the application control system includes a communication means within a smart device to send control signals wirelessly to a receiver included in a motorized entity.

Figure 7A:
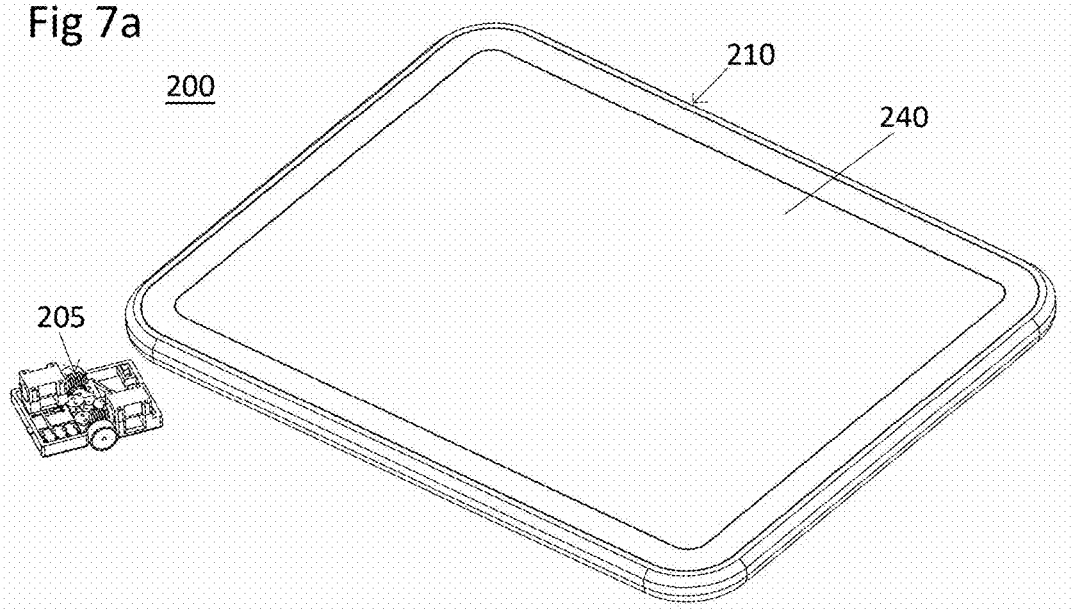
FIG. 7a is a perspective view of an illustrative control system.
Figure 7B:
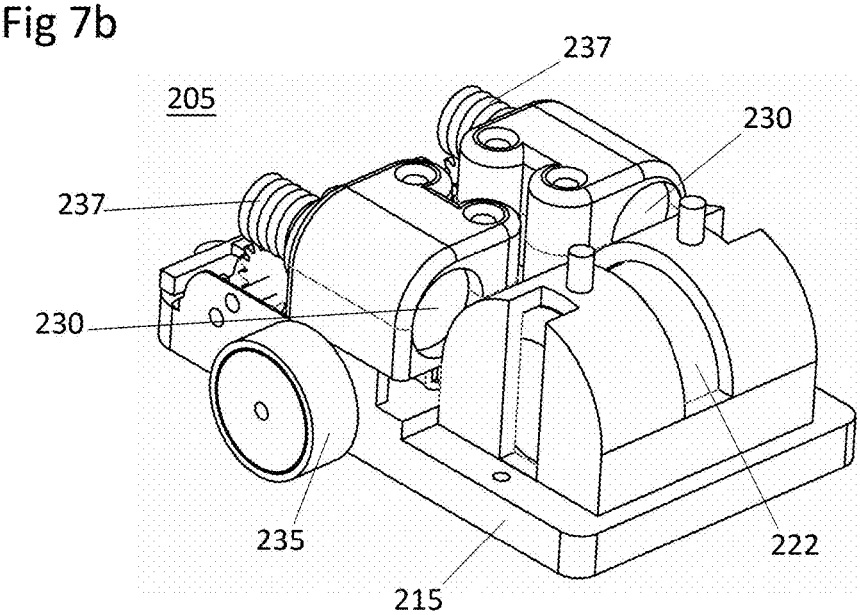

Referring now to FIGS. 7a and 7b, there is shown an exemplary control system 200 for a motorized entity 205 in accordance with another illustrative embodiment. The control system 200 may direct entity 205 movements in accordance with programmed sets of software instructions incorporating the elements of an electronic device 210 and entity 205. Examples of electronic devices include, but are not limited to, smart devices such as tablets, smartphones or other similar devices.

Continuing to refer to FIG. 7b and now additionally FIGS. 8a-8h, the entity 205 may include a chassis 215, an entity integrated circuit ("IC") 220, one or more sensors (described below), and a motorized capability to move the entity 205. The entity IC 220 may include one or more sets of programmed software instructions such as a set of entity control software instructions configured to activate and direct the motorized capability to move the entity 205. The motorized capability to move the entity 205 may include a power source 222, two motors 230 in communication with the power source 222, entity IC 220 and wheels 235. The entity IC 220 may further include a set of marker location software instructions with a capability to facilitate location of a position marker 238 (described below) displayed on an electronic device display 240. The one or more sensors have the capability to recognize pixel arrangements on the display 240. For example and as described herein, the pixel arrangement may be in the form of a border for a position marker 238. Another example of a pixel arrangement is an image. When a sensor detects a pixel arrangement such as the position marker border, the sensor may send a detection signal to the entity IC 220 identifying detection. The set of entity control instructions may utilize the detection signal(s) to determine appropriate output of control signals to direct entity 205 performance and/or actions, such as the motorized capability to move the entity 205. For example, the controls signals may activate the two motors 230 to rotate the wheels 235 to steer and move the entity 205 in a manner known as tank-drive steering. Each wheel 235 may be in communication with a drive gear train 236 meshed to a worm gear 237 where the worm gear 237 is driven by its respective motor 230. Powering the motor 230 in a first direction may drive the wheel 235 forward while powering the motor 230 in a second direction may drive the wheel 235 in reverse. Sensors 242, such as photo transistors, may be positioned on the bottom of the chassis 215 such that the sensors 242 face the display 240 of the electronic device 210 when the entity 205 is positioned on the display 240. Photo transistors may also recognize differences in light intensities to facilitate detection of pixel arrangements.

The electronic device 210 may include the display 240 and an electronic device IC 245 (described further below).

The electronic device IC 245 may include one or more sets of programmed software instructions including a set of entity location software instructions with a capability to locate the entity 205 when positioned on the display 240. The electronic device IC 245 may also include a set of marker control programmed software instructions with a capability to generate and display the position marker 238, shown in FIG. 8e, at different locations on the display 240 to direct entity 205 movements. The entity the entity 205 may further include a speaker 211 in communication with the entity IC 220 to receive control signals to activate audio content stored on the entity IC 220. The set of marker control software instructions may also include a capability to generate and display a pixel arrangement with audio instructions embedded therein and in accordance to the audio content. When utilizing a pixel arrangement with audio instructions embedded therein, the set of entity control software instructions may be configured to (i) receive one or more detection signals from the one or more sensors indicating detection of a pixel arrangement with audio commands instructions embedded therein, (ii) direct the entity IC to translate the audio instructions to audio control signals, and (iii) direct the audio content to output via the speaker in accordance with the audio control signal.

The display 240 may also include touch capacitance capability to facilitate user determined locations for the position marker 238 to move to and to facilitate user control of the entity 205 with a touch capacitance controller (further described herein). In one illustrative example, a user may touch a target location for the entity 205 on the display 240 and the set of marker control software instructions may further be configured to generate and display a programmed pattern of subsequent position markers to direct movement of the entity to the target location.

The entity 205 may further include a capability to trigger a change in the display's 240 capacitance levels at different locations on the display and in accordance to a position of the entity 205 when a user touches the entity 205. One illustrative example of the capability to trigger a change in the display's 240 capacitance levels is an inclusion of a piece of conductive metal, such as a thin piece of copper 241 secured to the chassis 215 positioned such that the thin piece of copper 241 touches the display 240. In this illustrative example, the display's 240 level of capacitance changes at the position of the entity 205 when a user touches the thin piece of copper 241 and the thin piece of copper 241 transfers the charge of a user. As such, the electronic device 210 may determine the entity's 205 location on the display 240 when the user touches the entity 205 and/or may activate programmed content when the user touches the entity 205. The piece of copper 241 may also be in communication with the entity IC 220 and a power source such that the entity IC 220 may direct a charge to the piece of copper 241 without a user's touch.

The electronic device IC 245 may also include a set of position marker software instructions with a capability to generate and display one or more position markers having an area within a pixel arrangement and the entity IC 220 may also include a set of entity response software instructions and a capability to activate a response element of a plurality of response elements. Response element examples include but are not limited to the light 212, the speaker 211 and the motor 230. In this illustrative example, the one or more sensors 242 may detect a pixel arrangement and may be configured to send a detection signal to the entity IC 220 upon detection thereof. The set of position marker software instructions may be configured to generate and display one or more pixel arrangements on the display 240 and the set of entity response software instructions may be configured to receive one or more detection signals from the one or more sensors 242 indicating detection of a pixel arrangement and to send control signals to the entity IC 220. As such, the entity IC 220 may trigger the capability to activate the response elements and may illuminate the light 212, direct output of audio content via the speaker 211, activate the motor 230 and/or a combination thereof.

Figure 8F:
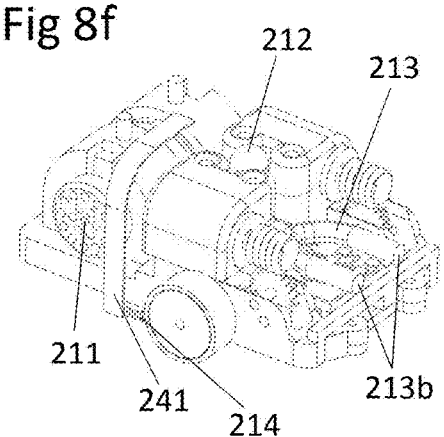
FIG. 8f is a front perspective view of another illustrative entity.
Figure 8G:
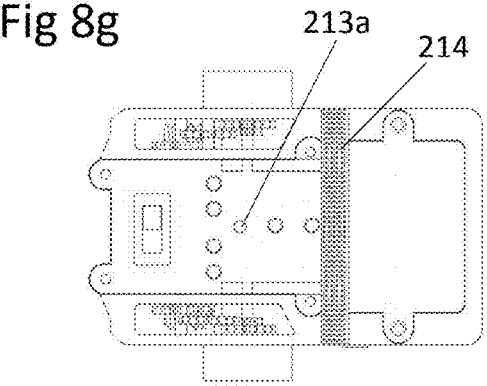
FIG. 8g is a bottom view of the entity from FIG. 8f.
Figure 8H:
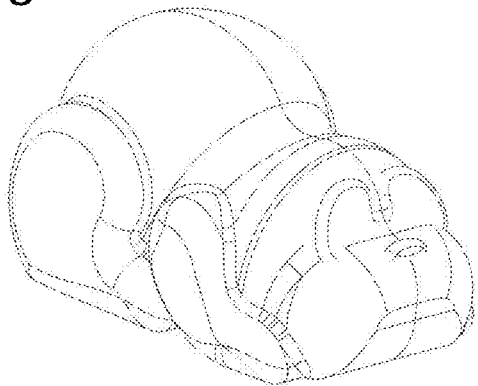
FIG. 8h is a front perspective view of an illustrative housing.
Figure 8I:
FIG. 8i is a front perspective view of another illustrative housing.
Figure 8J:
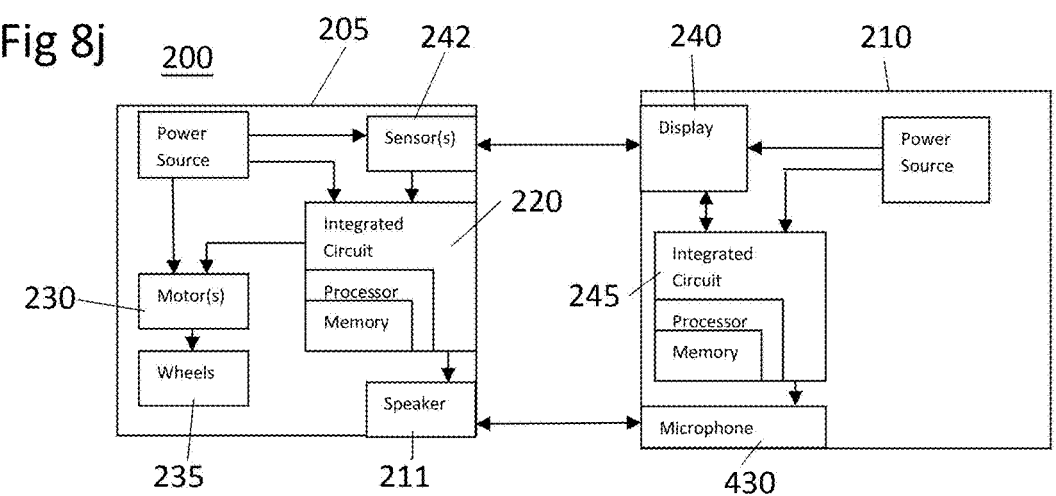
FIG. 8j is a block diagram of an illustrative control system.

The position marker 238 may have a marker area 255 within a marker border 260 made up of a pixel arrangement. Multiple types of position marker shapes are discussed further herein. Now again referring to FIGS. 8f-8j, multiple housing forms may be utilized to house the entity 205 including but not limited to animal and vehicle forms. FIG. 8h shows an illustrative example of a housing 261 for the entity 205 shaped to resemble a puppy. FIG. 8i shows an illustrative example of a plush housing 262 for the entity 205 shaped to resemble a fluffy character. The entity 205 may also include a light emitting diode 212 to illuminate a portion(s) of the entity 205 such as the eyes of a character or headlights of a vehicle. A light emitting diode may also be positioned to illuminate a surface below the entity 205 when a display 240 is not present such that the sensors 242 may detect a surface position marker(s). In one illustrative example, the position marker 238 may be included on a piece of paper to utilize the entity 205 capabilities described herein. A light pipe(s) 213 may also be included in the entity to facilitate distribution of light from a light source, such as a light emitting diode or the display 240. In one illustrative example, the light pipe 213 may be positioned on the chassis such that a first portion 213a of the light pipe 213 transfers light emitting from the display 240 to a second portion 213b of the light pipe 213. The entity 205 may also include a capability to clean the display 240. In one illustrative example, the capability to clean the display may include a brush 214 or cloth secured to the chassis 215 that contacts the display when the entity 205 is positioned on the display 240.

In this illustrative embodiment, the entity 205 utilizes six sensors 242 to define a t-shaped configuration 270. Different types of sensors and sensor configurations are available and described herein. While the type of sensor may vary, a photo transistor is one example which may provide the capability to recognize differences in light intensities to facilitate detection of a pixel arrangement such as the position marker border 260, further utilizing detections to direct entity movements, a principle now more fully described with another exemplary sensor 275.

Now referring to FIGS. 9a-9c, the sensor 275 may face a display 276. The display 276 is shown in this illustrative example displaying a white background, however the display 276 may also display other backgrounds such as a black background for use with a white position marker. A pixel arrangement in the form of a bar 280 is displayed in three subsequent locations, appearing to move across the display 276 and under the sensor 275. In FIG. 9a, the sensor 275 does not detect the bar 280. In FIG. 9b, the bar 280 is displayed below the sensor 275 and as such the sensor 275 detects the bar 280 due to a change in light intensity which may trigger transmission of a detection signal, for example to an integrated circuit (not shown) in communication with the sensor 275. In FIG. 9c, the sensor 275 does not detect the bar 280 and thus does not transmit a detection signal. The integrated circuit may use receipt of the detection signals in accordance with programming to send other signals as desired. FIGS. 9d-9f provide one illustrative example where an exemplary motorized entity 285 may include two sensors 290, an integrated circuit (not shown) and a motorized capability to move (not shown) the entity 285 away from a pixel arrangement and maintain positioning in relation to the bar 295 when displayed on a display 294 and detected. Here, the pixel arrangement is bar 295 (For clarity, FIG. 9e shows the bar 294 completely visible when under the entity 285, though it should be understood that the bar 294 would not be completely visible when below the entity 205). In FIG. 9d, the sensors 290 do not detect the bar 295. In FIG. 9e the sensors 290 may detect the bar 295 and may send a detection signal to the integrated circuit. The integrated circuit receives the detection signals and may send control signals to the motorized capability to move the entity 285, such that the entity 285 moves away from the bar 295 in accordance to desired software instructions, further shown here moving to the right by directional reference arrow 296, to the location shown in FIG. 9f. As such, movement of the entity 285 may be controlled by displaying the bar 295 in subsequent locations and triggering the sensors 290 to send detection signals to the integrated circuit to direct activation of the motorized capability to move the entity 285 in accordance with programming and/or a set of software instructions.

Figure 10A:
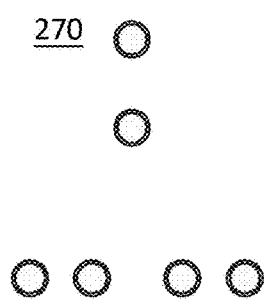
FIG. 10a is an illustrative sensor configuration.
Figure 10B:
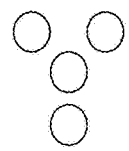
FIG. 10b is an illustrative sensor configuration.
Figure 10C:
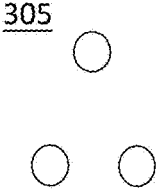
FIG. 10c is an illustrative sensor configuration.
Figure 10D:
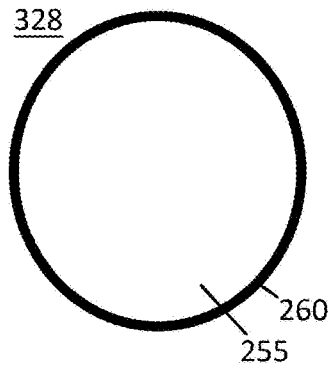
FIG. 10d is an illustrative position marker.
Figure 10E:
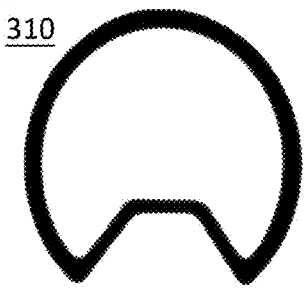
FIG. 10e is an illustrative position marker.
Figure 10F:
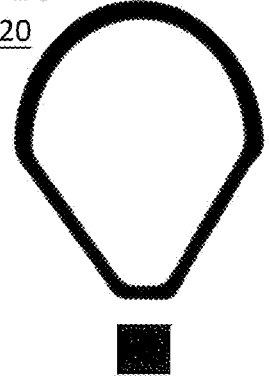
FIG. 10f is an illustrative position marker.
Figure 10G:
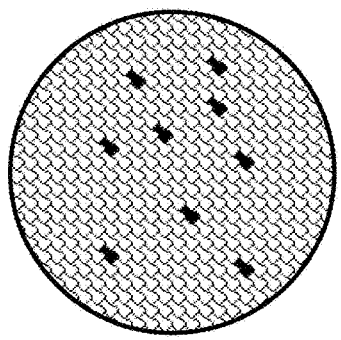
FIG. 10g is an illustrative pixel arrangement.
Figure 10H:
FIG. 10h is an illustrative pixel arrangement.
Figure 10I:
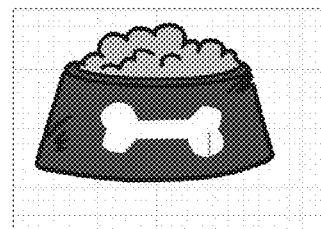
FIG. 10i is an illustrative pixel arrangement.

As mentioned above, varied sensor configurations may be utilized by the control system 200. FIG. 10a shows the t-shaped configuration 270 as described above. In another exemplary sensor configuration as shown in FIG. 10b, a positioning of sensors four sensors may define a Y-shaped configuration 300. In yet another exemplary sensor configuration as shown in FIG. 10c, a positioning of three sensors may define a triangular configuration 305. Additionally, varied shapes of position markers may be utilized with the control system 200. As described above, FIG. 10d shows position marker 238 in the shape of a circle with area 255 within a pixel arrangement in the form of border 260. Another exemplary position marker 310 may include a shape of a circle with a cutout. Yet another exemplary position marker 320 may include a shape of pie piece and square. Different sensor configurations and position marker shapes may be utilized in multiple combinations to obtain varied entity movement performance results at the direction of software instructions described herein. The sensor 242 may also be an image sensor to capture a pixel arrangement with instructions embedded therein and displayed on the display, further defined as an instructional pixel arrangement. FIG. 10g shows an exemplary instructional pixel arrangement where individual pixels are illuminated for identification. FIG. 10h shows an exemplary instructional pixel arrangement as a quick response code ("QR Code"). FIG. 10i shows yet another exemplary instructional pixel arrangement as an image of a bone. When the control system 200 utilizes an instructional pixel arrangement such as those included in FIGS. 10g-10i and in combination with an image sensor, a set of software instructions may include a capability to generate and display the instructional pixel arrangement with software operating instructions embedded therein, such as audio and/or performance instructions. The image sensor may capture the instructional pixel arrangement and send the same to the entity IC 220 where the entity IC 220 translates the embedded software operating instructions into control signals. The control signals are then sent to the desired entity 205 element, such as the motors 230 or the speaker 211, to execute the software operating instructions in accordance to the programmed content so that the entity 205 may execute a programmed pattern of movements while outputting audio following the capture of an instructional pixel arrangement. In one illustrative example, the entity control software instructions may be configured to (i) receive one or more detection signals from the image sensor indicating detection of the instructional pixel arrangement (ii) direct the entity IC 220 to translate the software operating instructions to control signals, and (iii) direct the entity 205 to operate in accordance with the programmed content. In another illustrative example a flash display pattern of a pixel arrangement, such as the pixel arrangement in FIG. 10g, may be utilized to direct entity 205 responses. The flash display pattern may include one or more flashes of the pixel arrangement that correspond to entity performance content. For example, the display 240 may flash the pixel arrangement three times, which corresponds to a certain set of performance movements and/or audio output. In this illustrative example, the marker control software instructions may include a capability to generate and display the pixel arrangement in the flash display pattern to trigger operating software instructions in accordance with desired entity performance content. The entity control software instructions may be configure to (i) receive one or more detection signals from the one or more sensors indicating detection of the flash display pattern; (ii) direct the entity IC 220 to translate the flash display pattern to control signals in accordance with the entity performance content; and (iii) direct the entity 205 to operate in accordance with the control signals.

Now referring again to the control system 200, the entity 205, and additionally to FIGS. 11a-11j, the sensors 242 are further defined as sensor 242a, 242b, 242c, 242d, 242e, and sensor 242f in the t-shaped configuration 270 (For clarity, only the sensors 242 of entity 205 are shown in FIGS. 11a-11j). In FIG. 11a, the sensor configuration 270 and position marker 238 are in a ready state alignment. The ready state alignment is a desired alignment between the desired sensor configuration and desired position marker. Software instructions may provide parameters for the desired ready state alignment in accordance to desired control system 200 performance. In this illustrative example, the ready state alignment is further defined as the sensor configuration 270 positioned within the position marker border 238 as shown in FIG. 11a. In FIGS. 11a-11e, a set of marker control software instructions which may be configured to display the position marker 238 in subsequent locations to direct entity 205 to move to the right and rotate ninety degrees by triggering the sensors 242 with the position marker border 238 on an exemplary display 321. The set of entity control software instructions are configured to move the entity in response to detection of the position marker border 238 and such that the entity 205 returns and/or remains in the ready state alignment within the position marker border 238. Other embodiments may utilize software instructions to direct the entity to maintain a position outside of the position marker and/or a portion of the position marker. Reference center line 323 is included to provide clarity on entity 205 rotation. In FIG. 11b, the set of marker control software instructions may display the position marker 238 in a subsequent location to the right of the positioning from FIG. 11a, such that sensor 242a and sensor 242c detect the border 260 and send a detection signal to the entity IC 220. The set of entity control software instructions may receive the detection signals and send control signals to the two motors 230. Since in this situation the entity IC 220 received signals from sensor 242a and sensor 242c, the two motors 230 are activated to power and rotate the entity 205 to adjust alignment and return to the ready state alignment, now rotated slightly to the right as shown in FIG. 11c. In FIG. 11d, the position marker 238 is displayed in another subsequent position to the right, triggering sensor 242c and sensor 242d to send detection signals to the entity IC 220. As such, the two motors 230 receive another set of control signals from the entity IC 220 to continue turning in accordance with the subsequent locations of the position marker 238 to adjust the entity 205 positioning to the ready state alignment as shown in FIG. 11e where the entity 205 is facing ninety degrees to the right of the starting position in FIG. 11a. Additionally, the entity IC 220 utilizes a lack of detection signals from the sensors 242 to further assist in determining control signals to send to the entity 205 to maintain the ready state alignment further described below. For example, in FIG. 11b, sensors 242b, 242d, 242e and 242f do not send a detection signal.

FIGS. 11f-11j show an illustrative example where the position marker 238 is displayed in subsequent locations to the right and forward of the starting position in FIG. 11f. In FIG. 11f, the sensor configuration 270 is in the ready state alignment within the position marker 238. In this example the set of marker control software instructions is configured to display the position marker 238 in subsequent locations to direct entity 205 movement such that the entity 205 will remain in the ready state alignment within the position marker border 238. In FIG. 11g, the set of marker control software instructions display the position marker 238 in a location to the right and then forward of the location in FIG. 11f. As such, sensor 242d may detect the border 260 and send a detection signal to the entity IC 220. Additionally, the other sensors 242 do not detect the position marker 238. The set of entity control software instructions receive the detection signal (and note the lack of other detections signals) and send control signals to the two motors 230. Since in this situation the entity IC 220 received signals from sensor 242c and none of the others, the two motors 230 are activated to power and move the entity 205 to adjust alignment and return to the ready state alignment as shown in FIG. 11h. In FIG. 11i, the position marker 238 is displayed in another subsequent position to the right and forward, triggering sensor 242d and sensor 242e to send detection signals to the entity IC 220. As such, the two motors 230 receive another set of control signals from the entity IC 220 to move in accordance with the subsequent locations of the position marker 238 and adjust the entity 205 positioning to the ready state alignment as shown in FIG. 11j. As such, this interaction may be further applied to an exemplary programmed pattern for directing movement of the entity 205 now described.

As mentioned, the control system 200 includes a capability to direct entity 205 movements on the display 240. In one example of operation and now referring to FIG. 12, the set of marker control programmed software instructions may be configured to generate and display the position marker 238 in a programmed pattern of the subsequent locations on the display 240 and to direct the entity 205 to maintain the ready state alignment within the border 260. FIG. 12 shows one illustrative example of subsequent display locations for the position marker 238 starting a position 239a, ending at 239b, and a plurality of position there between. (For clarity, the display locations for the position marker 238 are shown as if displayed simultaneously, however in accordance to the disclosure herein, it is understood that the position marker 238 is displayed in subsequent locations in accordance with programming and/or a desired pattern.) Numerous programmed patterns are available to utilize in combination with play patterns and play content. The capability to direct entity movements further includes the set of entity control programmed software instructions which may be configured to receive one or more detection signals from the sensors 242 indicating detection of the border 260. Further, control signals may be sent to the motorized capability to move the entity 205 such as directing motor outputs to maintain entity 205 positioning within the detected border 260 as described above. By generating subsequent locations for the position marker 238, the position marker 238 appears to move across the display 240. The distance between each location may be in increments sized appropriately to facilitate desired entity 205 response movements in accordance with software instructions. The programmed pattern as shown in FIG. 12 may direct the entity 205 to move from position 239a to position 239b as the sensors 242 detect the border 260 and the entity 205 adjusts positioning to return and/or remain in the ready state alignment.

Now referring to FIG. 13, the entity 205 and electronic device 210 may include another illustrative embodiment of programmed software instructions to collect and/or locate the entity 205 when positioned on the display and to further direct the entity 205 to a desired location 400 on the display 240. The set of marker control programmed software instructions may include a capability to display the position marker 238 in a plurality of shapes 402, each of the plurality of shapes including an area within a border made up of an arrangement of pixels in contrast to the display 240. The plurality of shapes 402 may be generated and displayed in subsequent position marker shapes and/or locations where each subsequent position marker shape may have an area smaller than the previous position marker. FIG. 13 shows seven position markers, however as mentioned above it should be understood that the number of position markers may vary in accordance to desired performance. The plurality of shapes 402 may include an initial marker 410 having an initial area. The size of the initial area may vary and/or may be greater than, equal to or less than an area of the display 240 and is preferred to have the largest shape area of the plurality of shapes 402. Additionally, the plurality of shapes 402 may include a location marker 420 to generate at the desired location 400. FIG. 13 shows an illustrative example where the position marker 238 may have a rounded shape. In this illustrative example, the entity 205 is placed on the display 240 and the set of marker control programmed software instructions may be configured to generate and display the position marker 238 as the initial shape 410. If the initial marker 410 area is at greater than or equal to the display area 415 (and in certain situations less than the display area 415), the entity 205 is within initial marker 410 area when placed on the display 240. The set of marker control programmed software instructions then generate and display subsequent position maker shapes 402 where each subsequent position marker shape 402 has an area smaller than the previous. By displaying the subsequent markers in gradually reduced size increments, the border 260 of one of the subsequent markers will trigger a first detection by the sensors 242 and continue to trigger the sensors 242 so long as the reduced size increments are such that they do not pass, or "skip" the sensors 242. For one illustrative example, the incremental distances may be equal to a sensor detection distance further defined as a distance less than or equal to the distance between the sensors 242. Following the first detection, the set of entity control programmed software instructions may be configured to receive the detection signals from the sensors 242 and send control signals to the motorized capability to move the entity 205 to maintain entity 205 positioning in relation to the detected border and/or return to the ready state alignment within the position marker area (as shown with the subsequent locations of entity 205 in FIG.

13). As such, the sensors 265 continue to send detection signals to the entity IC 220 upon border detection to activate the motorized capability to move the entity as the location of the position markers change, directing the entity 205 to the location 400 and within the location marker 420.

Now referring to FIGS. 14a-14f, the control system 200 may include another illustrative embodiment of programmed software instructions with a capability to locate the entity 205 when positioned on the display 240. In this illustrative embodiment, the electronic device 210 may further include a microphone 430 to detect audio and the entity 205 may further include a speaker 211 to emit audio content. An entity locating set of programmed software instructions may be configured to generate and display a sequence of pixels in a location pattern. The location pattern may be further defined as a pattern of illuminating pixels in a sequence that passes each possible location of the entity 205 to locate the entity 205 regardless 205 positioning on the display. In FIGS. 14b-14d, three illustrative location patterns are shown with illuminated pixel(s) 440 as a series of lines. In FIG. 14b, line 440 illustrates a path of illuminated pixels starting in an upper left hand corner of the display 240, traveling to a right corner of the display 240 and further as shown in accordance with line reference arrows. In FIG. 14c, line 440 illustrates a path of illuminated pixels starting in a lower right hand corner of the display 240, traveling to the upper right hand corner of the display 240 and further as shown in accordance with the reference arrows. In both FIGS. 14b and 14c, the location pattern meets the entity 205 at region 445. In FIG. 14d, the location pattern includes two lines 440 at a first position 446. Directional reference arrows 447 indicate a direction for a location of subsequently displaying lines 440. At a location position 448 of the lines 440, the one or more sensors 242 detect lines 440 and send a detection signal to the entity IC 220. Subsequent line 440 positions (not shown) are displayed in subsequent increments between and/or after the first position 446 and the location position 448 to ensure detection by the entity 205 when the entity is not positioned at location position 448. In FIG. 14e the location pattern includes line 440 which includes individual pixels 441 from a plurality of pixels illuminated in a sequence. When the path of illuminated pixels is detected by the one or more of the sensors 242, a detection signal is sent to the entity IC 220. For each of the location pattern examples in FIGS. 14b-14e, the set of entity control programmed software instructions may further be configured to receive the detection signal and send a control signal to the speaker 435 to emit an audio location output which may be detected by the microphone 430. The microphone 430 may then send an audio output detection signal to the electronic device IC 245 with a time stamp. As such, the set of entity locating programmed software instructions may compare the time stamp of the audio output detection signal with the corresponding generation of the pixel(s) that triggered the sensor(s) 242 to determine the location of the entity 205 on the display 240. In FIG. 14f, a snapshot of an exemplary game is shown with an entity touch capacitance controller 449 in a corner of the display 240. The touch capacitance controller 449 is in communication with the device IC 245 to direct the device IC 245 to display the position marker in subsequent locations, and as such direct movement of the entity 205 as described above. In this illustrative game, the object is to control the entity 205 and avoid the sequence of illuminated pixels 440, similar to a game of "cat and mouse." As with the above, when the sensors on the entity 205 detect the illuminated pixels 440, audio may be triggered to indicate "catching" the entity 205. This is but one example of game play that may be utilized with the control system 205.

Now referring to FIGS. 15a and 15b, the control system 200 may include another illustrative embodiment of programmed software instructions where the entity 205 locates the position marker 238 when the entity 205 is positioned on the display 240. In this illustrative example, the set of programmed software instructions may include a capability to generate and display a position marker 238 on the display 240. The set of entity control programmed software instructions may be configured to activate the motorized capability to move the entity 205 to execute a location movement. One example of a location movement is a series of entity 205 movements in a programmed pattern on the display 240. Examples of programmed patterns may include, but are not limited to, a zigzag pattern as shown in FIG. 15a and a spiral pattern as shown in FIG. 15b where line 444 shows the path of programmed entity 205 movement. The entity 205 may execute the location movement until one or more of the sensors 242 detect the position marker 238. As such, the electronic device 210 generates and displays the position marker 238, and the entity executes a location movement when placed on the display 240, directing the entity 205 to follow the preprogrammed pattern until the sensors 242 locate the position marker 238. Once the position marker 238 is located, the device 210 and entity 205 may have the capability to interact in a number of different configurations with the elements of the entity 205 and varying software instructions such as the configurations described above.

From the foregoing and as mentioned above, it will be observed that numerous variations and modifications may be effected without departing from the spirit and scope of the novel concept of the invention. It is to be understood that no limitation with respect to the specific methods and apparatus illustrated herein is intended or inferred.

The invention claimed is:

1. A control system for a motorized entity comprising:
    an electronic device with a display, and an electronic device integrated circuit with a set of marker control software instructions with a capability to generate and display a position marker having an area within a pixel arrangement;
    an entity with one or more sensors in communication with an entity integrated circuit, the entity integrated circuit in communication with a motorized capability to move the entity and including a set of entity control software instructions, the one or more sensors capable of detecting a pixel arrangement and configured to send a detection signal to the entity integrated circuit upon detection thereof; and
    a capability to direct entity movements,
    wherein the set of marker control software instructions is configured to direct the electronic device to
        (i) generate and display the position marker on the display, and
        (ii) generate and display the position marker in subsequent locations on the display in a programmed pattern,
    wherein the set of entity control software instructions is configured to direct the entity to
        (i) receive one or more detections signals from the one or more sensors indicating detection of a pixel arrangement, and
        (ii) send control signals to the motorized capability to move the entity to maintain entity positioning in relation to the detected pixel arrangement, and wherein when the entity is positioned within the pixel arrangement at an initial position and the one or more sensors detect the pixel arrangement and send a detection signal to the entity integrated circuit to activate the motorized capability to move the entity to maintain entity positioning in relation to the pixel arrangement such that the entity moves in accordance to the programmed pattern of the displayed subsequent locations of the position marker.

2. The control system of claim 1, wherein
the pixel arrangement surrounding the position marker area forms a border,
wherein the one or more sensors positioned within the border defines a ready state alignment,
and wherein the set of entity control software instructions is further configured to activate the motorized capability to move the entity to adjust entity positioning and move to the ready state alignment in the subsequent locations of the position marker.

3. The control system of claim 1, wherein the entity further comprises a speaker in communication with the entity integrated circuit further comprising audio content,
wherein the set of marker control software instructions further includes a capability to generate and display a pixel arrangement with audio instructions embedded therein and in accordance with the audio content,
and wherein the set of entity control software instructions is further configured to
(i) receive one or more detection signals from the one or more sensors indicating detection of a pixel arrangement with audio instructions embedded therein,
(ii) direct the entity integrated circuit to translate the audio instructions to audio control signals, and
(iii) direct the audio content to output via the speaker in accordance with the audio control signals.

4. The control system of claim 2, wherein the entity further includes at least one light emitting diode configured to illuminate a surface such that the one or more sensors may detect a position marker on the surface to activate the capability to move the entity.

5. The control system of claim 2, wherein the entity further includes a light pipe configured to utilize light emitting from the display to illuminate a portion of the entity.

6. The control system of claim 2, wherein the display further includes touch capacitance,
wherein the entity further includes a capability to trigger a change in capacitance levels of the display at different locations on the display in accordance to the positioning of the entity when a user touches the entity,
and wherein the electronic device integrated circuit determines the entity's location on the display when a user touches the entity.

7. The control system of claim 1, wherein the motorized capability to move the entity comprises
two motors in communication with the entity integrated circuit and a power source, each motor in communication with a respective wheel,
wherein the entity integrated circuit is configured to send control signals to activate the two motors to rotate each wheel in accordance with the set of entity control software instructions to move the entity.

8. The control system of claim 1, wherein the display further includes
a touch capacitance controller in communication with the device integrated circuit such that the touch capacitance controller directs the marker control software instructions to generate the position marker in a user determined pattern to direct movement of the entity in accordance thereto.

9. The control system of claim 1, wherein the motorized capability to move the entity comprises:
two motors in communication with the entity integrated circuit and power source, each motor in communication with a respective wheel;
a receiver in communication with the entity integrated circuit; and
a remote control unit with a transmitter,
wherein entity movements are initiated by user by sending commands to the receiver to activate the two motors to rotate each wheel in accordance to the commands.

10. The control system of claim 1, wherein the entity integrated circuit further includes programmed entity performance content and software operating instructions to activate the entity performance content,
wherein the pixel arrangement is further defined as an instructional pixel arrangement with the software operating instructions embedded therein,
wherein the marker control software instructions further include a capability to generate and display the instructional pixel arrangement,
wherein the one or more sensors includes an image sensor in communication with the entity integrated circuit and including a capability to capture the instructional pixel arrangement,
wherein the entity control software instructions are further configured to
(i) receive one or more detection signals from the image sensor indicating detection of the instructional pixel arrangement,
(ii) direct the entity integrated circuit to translate the software operating instructions to control signals, and
(iii) direct the entity to operate in accordance with the control signals such that
the entity executes the entity performance content in accordance to the control signals.

11. The control system of claim 1, wherein
the entity integrated circuit further includes programmed entity performance content and software operating instructions to activate the entity performance content,
a flash display pattern of the pixel arrangement corresponding to the entity performance content,
wherein the marker control software instructions further include a capability to generate and display the pixel arrangement in the flash display pattern to trigger the operating software instructions,
and wherein the entity control software instructions are configured to
(i) receive one or more detection signals from the one or more sensors indicating detection of the flash display pattern,
(ii) direct the entity integrated circuit to translate the flash display pattern to control signals in accordance with the entity performance content, and
(iii) direct the entity to operate in accordance with the control signals.

12. The control system of claim 1, wherein the display further includes touch capacitance capability, and
wherein the set of marker control software instructions is further configured to generate and display the programmed pattern of position markers to direct movement of the entity from the initial location to the target location in response to a user touch to a target location on the display.

13. The control system of claim 1, wherein the entity further includes an animal housing.

14. The control system of claim 1, wherein the entity further includes a chassis with a capability to clean the display by contacting the display when positioned there upon.

15. A control system for a motorized entity comprising:
an electronic device with a display having a display area and an electronic device integrated circuit with a set of marker control software instructions with a capability to display a plurality of position markers each including a marker area within a pixel arrangement and
the plurality of position markers including a location marker and an initial marker having an initial marker area;
an entity with one or more sensors in communication with an entity integrated circuit in communication with a motorized capability to move the entity and including a set of entity control software instructions, the one or more sensors capable of detecting pixels and pixel arrangements and configured to send a detection signal to the entity integrated circuit upon detection thereof; and
a capability to direct entity movements,
wherein the set of marker control software instructions is configured to direct the electronic device to
(i) generate and display the position marker as the initial marker and
(ii) generate and display subsequent position markers, each subsequent position marker having an area smaller than a previous position marker area, the last of the subsequent position markers displayed being the location marker at a location,
wherein the set of entity control software instructions is configured to direct the entity to
(i) receive one or more detection signals from the one or more sensors indicating detection of a pixel arrangement and
(ii) send control signals to the motorized capability to move the entity to maintain entity positioning in relation to the detected pixel arrangement,
and wherein the entity is further configured to move to the location as the one or more sensors send detection signals to the entity integrated circuit to activate the motorized capability to move the entity in accordance with detected pixel arrangements.

16. The control system of claim 15, wherein the initial marker area is greater than the display area.

17. The control system of claim 15, wherein the initial marker area is equal to the display area.

18. The control system of claim 15, wherein the initial marker area is less than the display area.

19. The control system of claim 15, wherein
the pixel arrangement surrounding the position marker forms a border,
wherein the one or more sensors are positioned within the position marker area to define a ready state alignment,
and wherein the set of entity control software instructions is further configured to activate the motorized capability to move the entity to return to the ready state alignment as the plurality of position markers are displayed at subsequent locations.

20. The control system of claim 19, wherein the set of marker control software instructions is further configured to display the plurality of position markers in subsequent locations at incremental distances equal to a sensor detection distance defined as a distance less than or equal to the distance between the sensors as mounted upon the entity.

21. The control system of claim 15, wherein the motorized capability to move the entity comprises
two motors in communication with the entity integrated circuit and a power source, each motor further in communication with a respective wheel,
wherein the entity integrated circuit is configured to send control signals to activate the two motors to rotate each wheel to move the entity in accordance with the set of entity control software instructions.

22. A control system for a motorized entity comprising:
an electronic device with a display and an electronic device integrated circuit including a set of marker control software instructions to generate and display a position marker having an area within a pixel arrangement;
an entity with one or more sensors in communication with an entity integrated circuit in communication with a motorized capability to move the entity upon the display and including a set of entity control software instructions, the one or more sensors capable of detecting pixel arrangements on the display and configured to send a detection signal to the entity integrated circuit upon detection thereof; and
the entity including a capability to locate the position marker wherein the set of entity control software instructions is configured to activate the motorized capability to move the entity to execute a location movement, the location movement further defined as a series of entity movements on the display in a preprogrammed pattern where the entity executes the movements until the sensors detect the pixel arrangement of the position marker,
wherein the electronic device is configured to generate and display the position marker such that when the entity is placed on the display and the set of entity control software instructions activates the location movement the entity moves in the preprogrammed pattern upon the display until the entity locates the position marker.

23. The control system of claim 22, wherein the entity further includes
a speaker in communication with the entity integrated circuit,
wherein the set of entity control software instructions is further configured to send a control signal to the speaker to emit an audio location output when the sensors detect the position marker,
wherein the electronic device further includes a microphone capable of detecting the audio location output and sending an audio output detection signal to the device integrated circuit,
and wherein the set of marker control software instructions is further configured to identify a location of the pixel illuminated at the time of sensor detection to determine the location of the entity.

24. The control system of claim 23, wherein the preprogrammed pattern is further defined as a zigzag pattern of entity movements.

25. The control system of claim 23, wherein the preprogrammed pattern is further defined as a spiral pattern of entity movements.

26. The control system of claim 20, wherein the motorized capability to move the entity comprises two motors in communication with the entity integrated circuit and a power source, each motor further in communication with a respective wheel, wherein the entity integrated circuit is configured to send control signals to activate the two motors to rotate each wheel in accordance with the set of entity control software instructions to move the entity.

27. The control system of claim 20, wherein the motorized capability to move the entity comprises:

two motors in communication with the entity integrated circuit and power source, each motor in communication with a respective wheel;

a receiver in communication with the entity integrated circuit; and a remote control unit with a transmitter, wherein entity movements are controlled by a user by sending commands to the receiver to activate the two motors to rotate each wheel in accordance to the commands.

* * * * *